(12) United States Patent
Liao

(10) Patent No.: US 10,900,720 B2
(45) Date of Patent: Jan. 26, 2021

(54) STACKABLE HEAT PIPE ASSEMBLY AND METHOD OF MAKING THE SAME

(71) Applicant: Wen Chih Liao, Keelung (TW)

(72) Inventor: Wen Chih Liao, Keelung (TW)

(*) Notice: Subject to any disclaimer, the term of this patent is extended or adjusted under 35 U.S.C. 154(b) by 54 days.

(21) Appl. No.: 16/159,699

(22) Filed: Oct. 14, 2018

(65) Prior Publication Data
US 2020/0116433 A1   Apr. 16, 2020

(51) Int. Cl.
*F28D 15/02* (2006.01)
*F28D 15/04* (2006.01)

(52) U.S. Cl.
CPC ..... *F28D 15/0266* (2013.01); *F28D 15/0283* (2013.01); *F28D 15/04* (2013.01)

(58) Field of Classification Search
CPC .... F28D 15/04; F28D 15/046; F28D 15/0283; F28D 15/0275; F28D 15/0266; F28F 2220/00
USPC ...................................................... 165/71, 72
See application file for complete search history.

(56) References Cited

U.S. PATENT DOCUMENTS

| | | | | |
|---|---|---|---|---|
| 2,971,671 | A * | 2/1961 | Shakman | B65D 7/04 220/624 |
| 4,760,878 | A * | 8/1988 | Fukui | F28D 15/0283 165/104.27 |
| 6,289,979 | B1 * | 9/2001 | Kato | F28F 9/0212 138/89 |
| 2004/0163799 | A1 * | 8/2004 | Connors | F28D 15/0283 165/104.26 |
| 2006/0011328 | A1 * | 1/2006 | Hul-Chun | F28D 15/046 165/104.26 |
| 2012/0145772 | A1 * | 6/2012 | Liao | B23K 35/02 228/183 |

* cited by examiner

*Primary Examiner* — Tho V Duong

(57) ABSTRACT

A stackable heat pipe assembly and method of making the same comprising first and second conductive metal plates, a conductive metal tube, and a working pipe is provided. The first and second conductive metal plates have first and second contact sides and first and second attachment sides, respectfully. The first conductive metal plate has a through hole therethrough. The first and second attachment sides have first and second planar central portions and first and second walls, first and second top ledges, and first and second expanded walls theresurrounding, respectively. The conductive metal tube has an inner wall having a wick structure thereon. A plurality of brazing rings are used to braze the working pipe to the through hole and the first and second planar central portions to the first and second attachment rim ends, respectively. Either of the first or second contact sides contacts a heat source and is stackable.

7 Claims, 10 Drawing Sheets

STACKABLE HEAT PIPE ASSEMBLY AND
METHOD OF MAKING THE SAME

BACKGROUND OF THE INVENTION

Field of the Invention

The invention relates to heat transfer mechanisms, and more particularly, to a stackable heat pipe assembly and method of making the same.

Description of the Related Art

Heat pipes are passive two-phase heat transfer mechanisms used to efficiently transport heat from one location to another through an evaporation-condensation process. With no energy input other than heat or moving parts required for operation, heat pipes are quiet and durable. Heat pipes are applied in cooling and heat transfer systems found in mobile phones, computers, aircraft, spacecraft, satellites, and environmental systems. Heat pipes, combined with thermo-electric generators (TEGs), are applied in waste heat recovery and power generation systems. Implementation of heat pipes and TEGs have also been used in geothermal applications where heat from a ground source is extracted to provide geothermal power.

TEG systems using heat pipes, take heat from the heat pipes and output electricity using thermo-electric modules. Thermo-electric modules are made up of many elements of n-type (negatively charged) and p-type (positively charged) semiconductor materials which are electrically connected in series to increase operating voltage and thermally connected in parallel to increase thermal conductivity. When the heat pipe side of the TEG system is heated (heat moved thereto) and the other side cooled by air, water, or another suitable medium, such as another heat pipe (heat moved therefrom), a voltage is generated. For a TEG system, DC power is passed through an inverter to produce AC power. With no moving parts and no chemical reactions required for operation, thermo-electric modules are also quiet and durable.

Although heat pipes are applied in many industries, implementation thereof can be challenging; for example, when the heat pipes and accompanying systems must succumb to mechanically challenging operating conditions or the natural environment having mid- to high-temperatures. Additionally, when heat pipes are employed in mid- to high-temperature environments, the shape of the heat pipe must conform to the environment and not compromise its functionality. In addition to eventual wear and corrosion, the distance from the initial heat source to a heat sink or a TEG system, as examples, can be in metres. Generally, the longer the distance required for a heat pipe to travel and the greater the design specialization, the greater the initial, maintenance and replacement costs.

There is demand for a stackable heat pipe assembly and method of making the same to solve the aforementioned problems.

BRIEF SUMMARY OF THE INVENTION

Stackable heat pipe assemblies and methods of making the same are provided.

In an embodiment, a stackable heat pipe assembly, under vacuum, having a working substance therein, comprising first and second conductive metal plates, a conductive metal tube, and a working pipe is provided. The first and second conductive metal plates have first and second contact sides and first and second attachment sides, respectfully. The first and second contact sides are substantially planar. The first contact side has a central cavity therein. A through hole is formed through the central cavity of the first contact side and first attachment side. The working pipe has an inlet end and an outlet end and the length of the outlet end exceeds that of the inlet end. When assembled, outer sidewall surfaces of the inlet end rests flush within the through hole of the first conductive metal plate.

In an embodiment, the conductive metal tube comprises an outer wall and an inner wall having a first attachment rim end, a second attachment rim end, and a wick structure therebetween.

In an embodiment, the first and second attachment sides have first and second planar central portions and first and second walls, first and second top ledges, and first and second expanded walls theresurrounding, respectively. When assembled, the first attachment rim of the first attachment rim end rests flush on the first top ledge and against the first expanded wall of the first attachment side and the second attachment rim of the second attachment rim end rests flush on the second top ledge and against the second expanded wall of the second attachment side.

In the embodiments, the stackable heat pipe assembly has one conductive metal tube; however, the embodiments are not limited thereto. In alternative embodiments, a stackable multi-heat pipe assembly, under vacuum, having a working substance therein, is provided, wherein in addition to the first and second conductive metal plates and working pipe, a plurality of conductive metal tubes and a main conductive metal tube are further provided. In an embodiment, the plurality of conductive metal tubes comprises five metal tubes. In an alternative embodiment, the plurality of conductive metal tubes comprises fifty or less metal tubes. In the embodiment, each of the plurality of conductive metal tubes comprises an outer wall and an inner wall having a first outer attachment rim end, a second outer attachment rim end, and an outer wick structure therebetween and a first inner attachment rim end, a second inner attachment rim end, and an inner wick structure therebetween, respectively. Additionally, the first outer attachment rim end and first inner attachment rim end and second outer attachment rim end and second inner attachment rim end further comprise a plurality of through holes therethrough, respectively, between the inner and outer wick structures and first and second attachment rims of each of the plurality of conductive metal tubes, respectfully.

In the embodiment, the main conductive metal tube, surrounding the plurality of conductive metal tubes, comprise a main outer wall and a main inner wall having a first main attachment rim end, a second main attachment rim end, and a main wick structure therebetween. In the embodiment, in addition to the first and second attachment sides having first and second planar central portions and first and second walls, first and second top ledges, and first and second expanded walls theresurrounding, respectively, the first and second attachment sides further comprise a plurality of first and second planar cylindrical portions and first and second cylindrical walls, first and second cylindrical top ledges, and first and second cylindrical expanded walls theresurrounding, respectively. Also, the first and second attachment sides yet further comprise first and second main circular grooves, surrounding the first and second substantially planar central portions and plurality of first and second substantially planar cylindrical portions, respectively. When assembled, the first attachment rim of the first attachment rim end of one of the plurality of conductive metal tubes rests flush on the first top ledge and against the first expanded wall of the first substantially planar central portion of the first attachment side and the second attachment rim of the second attachment rim end rests flush on the second top ledge and against the second expanded wall of the second substantially planar central portion of the second attachment side, respectively. Also, the first attachment rims of the first attachment rim ends of each one of the remaining plurality of conductive metal tubes rests flush on the first top ledge and against the first expanded wall of each one of the plurality of first substantially planar cylindrical portions of the first attachment side and the second attachment rims of the second attachment rim ends rest flush on the second top ledges and against the second expanded walls of each one of the plurality of second substantially planar cylindrical portions of the second attachment side, respectively. Additionally, a first main attachment rim of the first main attachment rim end and a second main attachment rim of the second main attachment rim end of the main conductive metal tube rest flush within the first and second main circular grooves, respectively.

In the embodiments, a plurality of brazing rings are used to braze the working pipe to the through hole of the first conductive metal plate and the first and second substantially planar central portions of the first and second conductive metal plates to the first and second attachment rim ends of the conductive metal tube, respectively. In an alternative embodiment, in addition to the plurality of brazing rings being used to braze the working pipe to the through hole of the first conductive metal plate and the first and second substantially planar central portions of the first and second conductive metal plates to the first and second attachment rim ends of one of a plurality of conductive metal tubes, respectively, a plurality of brazing rings is used to braze the first and second planar cylindrical portions of the first and second conductive metal plates to each of the plurality of first and second outer attachment rim ends of the plurality of conductive metal tubes, respectively, and first and second main attachment rim ends of the main conductive metal tube, respectively. In the embodiments, the brazing rings are made of a copper-silver alloy.

In an embodiment, the working substance of the stackable heat pipe assembly is made of water. In an embodiment, the first conductive metal plate, second conductive metal plate, conductive metal tube, and working pipe are made of copper; however the embodiments are not limited thereto. In an alternative embodiment, the first conductive metal plate, second conductive metal plate, conductive metal tube, and working pipe are made of monel, nickel, or titanium.

In an alternative embodiment, in addition to the first conductive metal plate, second conductive metal plate, and working pipe being made of copper, the plurality of conductive metal tubes and main conductive metal tube are also made of copper; however, the embodiments are not limited thereto. In yet another alternative embodiment, the first conductive metal plate, second conductive metal plate, plurality of conductive metal tubes, main conductive metal tube, and working pipe are made of monel, nickel, or titanium.

In the embodiments, the outlet end of the working pipe is partially cut and sealed at least once after being assembled, forming a final outlet end, following insertion of the working substance therein and vacuuming of air thereout, whereby a top of the final outlet end is lower than a surface plane of the first contact side of the first conductive metal plate.

In the embodiments, the stackable heat pipe assembly and stackable multi-heat pipe assembly are coated with gold, palladium, or silver. Either of the first or second contact sides contacts a heat source, whereby vapor of the working substance disposed within the heat source side flows through a center of the conductive metal tube or centers of the plurality of conductive metal tubes and main conductive metal tube to condense back to the working substance and be drawn to the wick structures of the inner and outer walls of the plurality of conductive metal tubes and main inner wall of the main conductive metal tube to flow back to the heat source side. Also, either of the first or second contact sides is stackable.

In an embodiment, a method of making a stackable heat pipe assembly, under vacuum, having a working substance therein is provided. The stackable heat pipe assembly comprises first and second conductive metal plates, a conductive metal tube, and a working pipe. In an alternative embodiment, in addition to the first and second conductive metal plates and working pipe, the stackable heat pipe assembly comprises a plurality of conductive metal tubes and a main conductive metal tube. In an embodiment, the plurality of conductive metal tubes comprises five metal tubes. In an alternative embodiment, the plurality of conductive metal tubes comprises fifty or less metal tubes.

In an embodiment, the method comprises Step (1110): determining if one conductive metal tube is to be provided, if no, performing Step (2120), if yes, performing Step (1120). In an embodiment, if it is determined that one conductive metal tube is to be provided, then Step (1120): providing a first conductive metal plate, second conductive metal plate, a conductive metal tube, a working pipe, and a plurality of brazing rings is performed.

In the embodiments, the first and second conductive metal plates have first and second contact sides and first and second attachment sides, respectfully. The first and second contact sides are substantially planar. The first contact side has a central cavity therein. A through hole is formed through the central cavity of the first contact side and first attachment side. The working pipe has an inlet end and an outlet end and the length of the outlet end exceeds that of the inlet end.

In an embodiment, the conductive metal tube comprises an outer wall and an inner wall having a first attachment rim end, a second attachment rim end, and a wick structure therebetween.

In an embodiment, the first and second attachment sides have first and second planar central portions and first and second walls, first and second top ledges, and first and second expanded walls theresurrounding, respectively.

In an embodiment, the method further comprises Step (1130): assembling the first conductive metal plate, second conductive metal plate, conductive metal tube, a working pipe, and a plurality of brazing rings, wherein the plurality of brazing rings are used to braze the working pipe to the through hole of the first conductive metal plate and the first and second substantially planar central portions of the first and second conductive metal plates to the first and second attachment rim ends of the conductive metal tube, respectively, then, performing Step (3140).

In an embodiment, outer sidewall surfaces of the inlet end of the conductive metal tube rests flush within the through hole of the first conductive metal plate. In an embodiment, the first attachment rim of the first attachment rim end rests flush on the first top ledge and against the first expanded wall of the first attachment side and the second attachment rim of the second attachment rim end rests flush on the second top ledge and against the second expanded wall of the second attachment side.

In an alternative embodiment, if it is determined that one conductive metal tube is not to be provided, then Step (2120): providing a first conductive metal plate, second conductive metal plate, a plurality of conductive metal tubes, a main conductive metal tube, a working pipe, and a plurality of brazing rings is performed.

In the embodiment, each of the plurality of conductive metal tubes comprises an outer wall and an inner wall having a first outer attachment rim end, a second outer attachment rim end, and an outer wick structure therebetween and a first inner attachment rim end, a second inner attachment rim end, and an inner wick structure therebetween, respectively. Additionally, the first outer attachment rim end and first inner attachment rim end and second outer attachment rim end and second inner attachment rim end further comprise a plurality of through holes therethrough, respectively, between the inner and outer wick structures and first and second attachment rims of each of the plurality of conductive metal tubes, respectfully.

In the embodiment, the main conductive metal tube, surrounding the plurality of conductive metal tubes, comprise a main outer wall and a main inner wall having a first main attachment rim end, a second main attachment rim end, and a main wick structure therebetween. In the embodiment, in addition to the first and second attachment sides having first and second planar central portions and first and second walls, first and second top ledges, and first and second expanded walls theresurrounding, respectively, the first and second attachment sides further comprise a plurality of first and second planar cylindrical portions and first and second cylindrical walls, first and second cylindrical top ledges, and first and second cylindrical expanded walls theresurrounding, respectively. Also, the first and second attachment sides yet further comprise first and second main circular grooves, surrounding the first and second substantially planar central portions and plurality of first and second substantially planar cylindrical portions, respectively.

In an embodiment, the method further comprises Step (2130): assembling the first conductive metal plate, second conductive metal plate, plurality of conductive metal tube, main conductive metal tube, working pipe, and plurality of brazing rings, wherein the plurality of brazing rings are used to braze the working pipe to the through hole of the first conductive metal plate and the first and second attachment sides of the first and second conductive metal plates to each of the plurality of first and second outer attachment rim ends of the plurality of conductive metal tubes, respectively, and first main and second attachment rim ends of the main conductive metal tube, respectively, then, performing Step (3140).

In an embodiment, outer sidewall surfaces of the inlet end of the conductive metal tube rests flush within the through hole of the first conductive metal plate. In an embodiment, the first attachment rim of the first attachment rim end of one of the plurality of conductive metal tubes rests flush on the first top ledge and against the first expanded wall of the first substantially planar central portion of the first attachment side and the second attachment rim of the second attachment rim end rests flush on the second top ledge and against the second expanded wall of the second substantially planar central portion of the second attachment side, respectively. Also, the first attachment rims of the first attachment rim ends of each one of the remaining plurality of conductive metal tubes rests flush on the first top ledge and against the first expanded wall of each one of the plurality of first substantially planar cylindrical portions of the first attachment side and the second attachment rims of the second attachment rim ends rest flush on the second top ledges and against the second expanded walls of each one of the plurality of second substantially planar cylindrical portions of the second attachment side, respectively. Additionally, a first main attachment rim of the first main attachment rim end and a second main attachment rim of the second main attachment rim end of the main conductive metal tube rest flush within the first and second main circular grooves, respectively.

In an embodiment, the method further comprises Step (3140): injecting a gas mixture of N2, NH4 and H2 having a ratio of 2:1:1 into a steel liner of a brazing furnace, Step (3150): burning the gas mixture of Step (3140), wherein the brazing furnace is heated to at least 220° Celsius, burning the gas mixture, eliminating oxygen, and removing impurities from the steel liner of the brazing furnace to obviate oxidation of the stackable heat pipe assembly or stackable multi-heat pipe assembly in the brazing furnace, and Step (3160): securing the stackable heat pipe assembly or stackable multi-heat pipe assembly to a bracket assembly of a conveyor system of the brazing furnace. Additionally, the method further comprises Step (3170): brazing the stackable heat pipe assembly or stackable multi-heat pipe assembly, wherein the brazing furnace is heated to at least 780° Celsius, whereby the plurality of brazing rings are melted, Step (3180): cooling the stackable heat pipe assembly or stackable multi-heat pipe assembly, wherein the stackable heat pipe assembly or stackable multi-heat pipe assembly is cooled to at least 150° Celsius, and Step (3190): securing the stackable heat pipe assembly or stackable multi-heat pipe assembly to a working bracket assembly. Also, the method further comprises Step (3210): partially cutting and sealing the outlet end of the working pipe of the stackable heat pipe assembly or stackable multi-heat pipe assembly, following insertion of the working substance therein and vacuuming of air thereout, Step (3220): determining if Step (3210) is to be repeated, if yes, performing Step (3210), if no, performing Step (3230), and Step (3230): cutting and sealing the outlet end of the working pipe of the stackable heat pipe assembly or stackable multi-heat pipe assembly, whereby a top of the final outlet end is lower than a surface plane of the first contact side of the first conductive metal plate.

In an embodiment, the working substance of the stackable heat pipe assembly is made of water. In an embodiment, the first conductive metal plate, second conductive metal plate, conductive metal tube, and working pipe are made of copper; however the embodiments are not limited thereto. In an alternative embodiment, the first conductive metal plate, second conductive metal plate, conductive metal tube, and working pipe are made of monel, nickel, or titanium.

In an alternative embodiment, in addition to the first conductive metal plate, second conductive metal plate, and working pipe being made of copper, the plurality of conductive metal tubes and main conductive metal tube are also made of copper; however, the embodiments are not limited thereto. In yet another alternative embodiment, the first conductive metal plate, second conductive metal plate, plurality of conductive metal tubes, main conductive metal tube, and working pipe are made of monel, nickel, or titanium.

In the embodiments, the outlet end of the working pipe is partially cut and sealed at least once after being assembled, forming a final outlet end, following insertion of the working substance therein and vacuuming of air thereout, whereby a top of the final outlet end is lower than a surface plane of the first contact side of the first conductive metal plate.

In the embodiments, the stackable heat pipe assembly and stackable multi-heat pipe assembly are coated with gold, palladium, or silver. Either of the first or second contact sides contacts a heat source, whereby vapor of the working substance disposed within the heat source side flows through a center of the conductive metal tube or centers of the plurality of conductive metal tubes and main conductive metal tube to condense back to the working substance and be drawn to the wick structures of the inner and outer walls of the plurality of conductive metal tubes and main inner wall of the main conductive metal tube to flow back to the heat source side. Also, either of the first or second contact sides is stackable.

These, as well as other components, steps, features, benefits, and advantages of the present application, will now made clear by reference to the following detailed description of the embodiments, the accompanying drawings, and the claims.

BRIEF DESCRIPTION OF THE DRAWINGS

The accompanying drawings, which are incorporated herein and form a part of the Detailed Description of the Invention, illustrate various embodiments of the present invention and, together with the Detailed Description of the Invention, serve to explain principles discussed below. The drawings referred to in this Brief Description of Drawings should not be understood as being drawn to scale unless specifically noted.

DETAILED DESCRIPTION OF THE INVENTION

Figure 1:
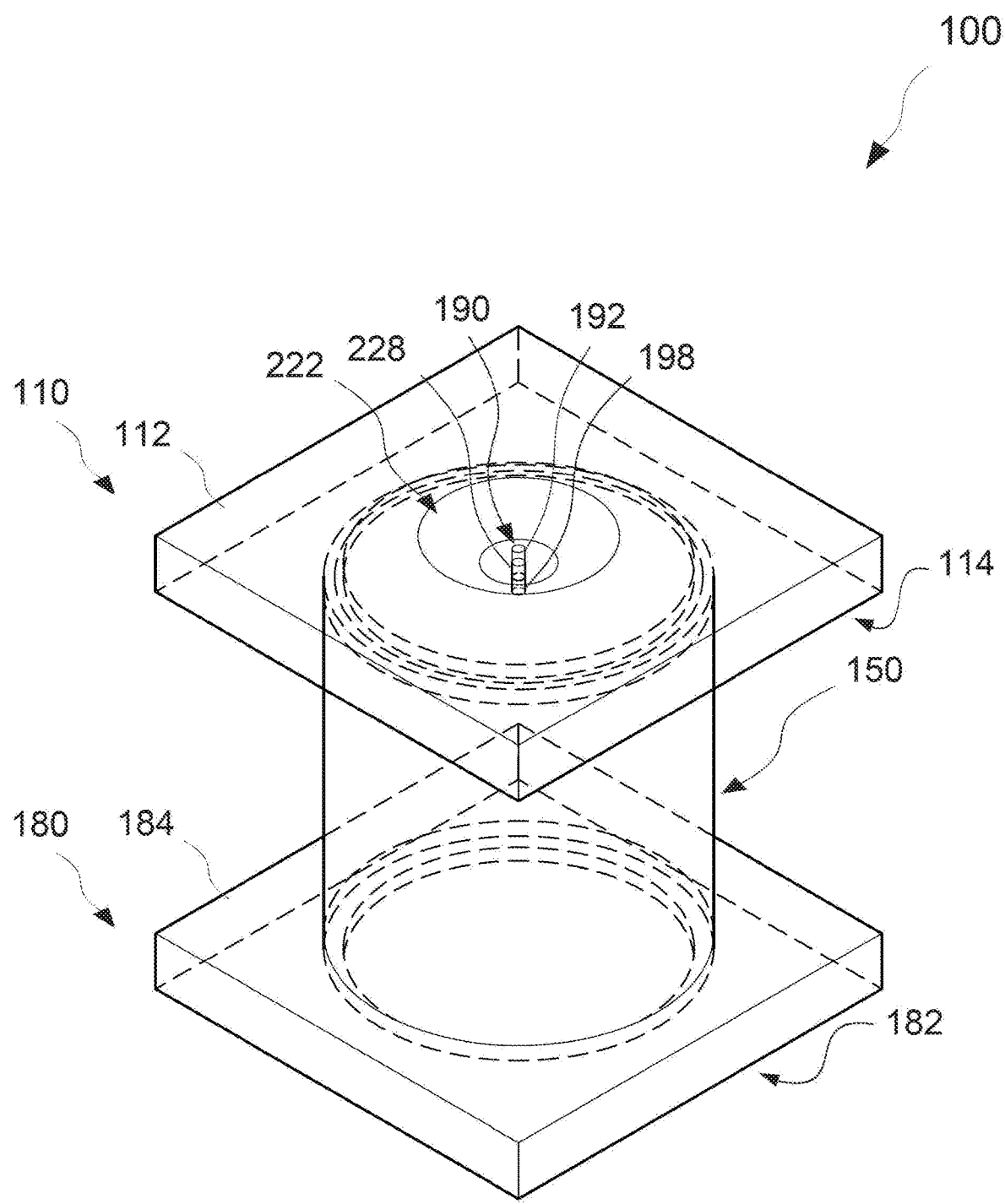
FIG. 1 is a schematic perspective view illustrating a stackable heat pipe assembly according to various embodiments.

It is understood that the following disclosure provides many different embodiments, or examples, for implementing different features of the invention. Specific examples of devices and arrangements are described below to simplify the present disclosure. These are, of course, merely examples and are not intended to be limiting. For example, the formation of a first feature over or on a second feature in the description that follows can include embodiments in which the first and second features are formed in direct contact, and can also include embodiments in which additional features are formed between the first and second features, such that the first and second features are not in direct contact. In addition, the present disclosure can repeat reference numerals and/or letters in the various examples. This repetition is for the purpose of simplicity and clarity and does not in itself dictate a relationship between the various embodiments and/or configurations discussed. It is intended that the scope of the present technology be defined by the claims appended hereto and their equivalents.

A stackable heat pipe assembly and method of making the same comprising first and second conductive metal plates, a conductive metal tube, and a working pipe is provided. The first and second conductive metal plates have first and second contact sides and first and second attachment sides, respectfully. The first conductive metal plate has a through hole therethrough. The first and second attachment sides have first and second planar central portions and first and second walls, first and second top ledges, and first and second expanded walls theresurrounding, respectively. The conductive metal tube has an inner wall having a wick structure thereon. A plurality of brazing rings are used to braze the working pipe to the through hole and the first and second planar central portions to the first and second attachment rim ends, respectively. Either of the first or second contact sides contacts a heat source and is stackable.

Figure 2:
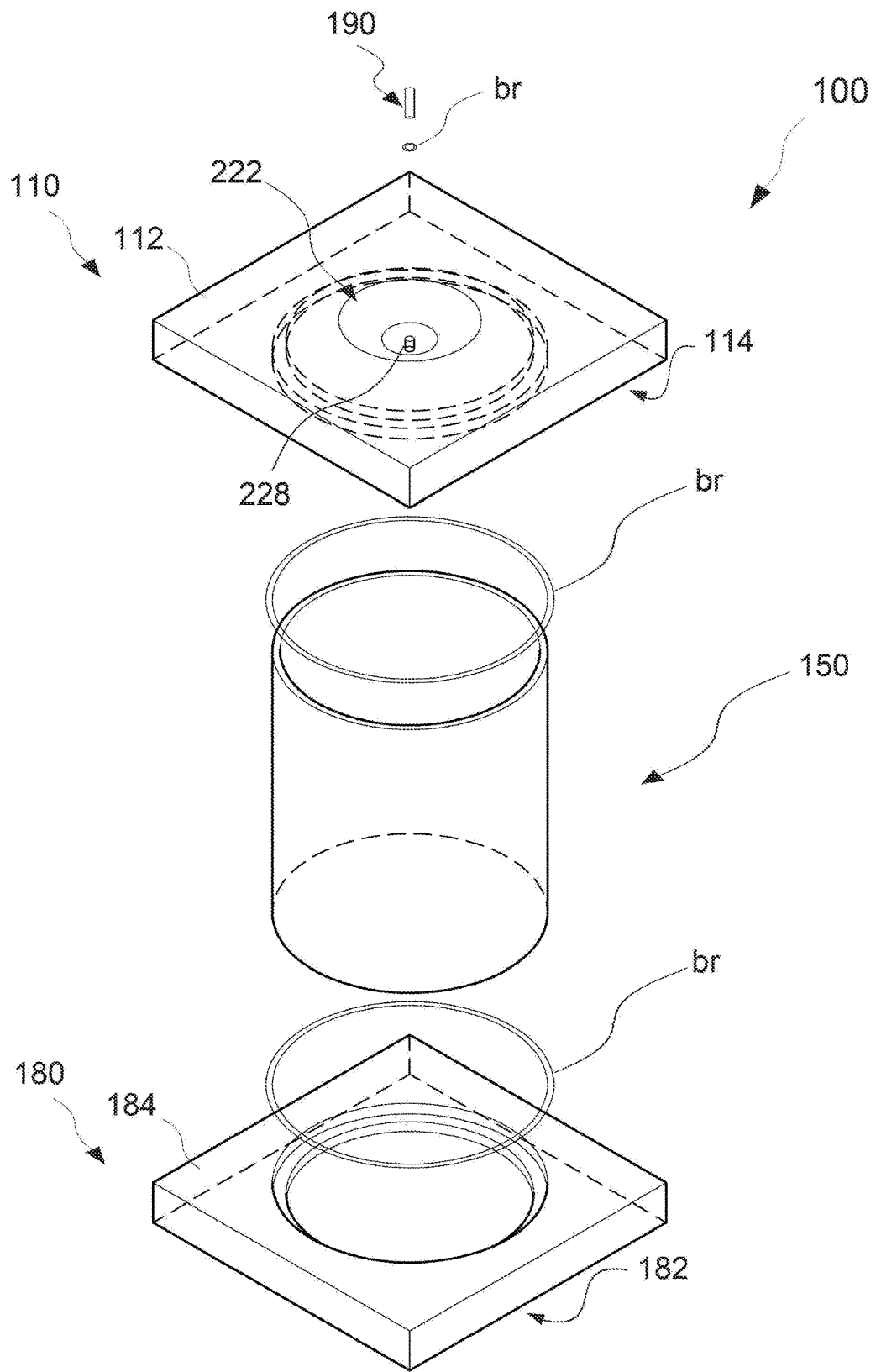
FIG. 2 is a schematic perspective exploded view illustrating a stackable heat pipe assembly according to various embodiments.

FIG. 1 is a schematic perspective view illustrating a stackable heat pipe assembly according to various embodiments. FIG. 2 is a schematic perspective exploded view illustrating a stackable heat pipe assembly according to various embodiments. As shown in FIG. 1 and FIG. 2, in an embodiment, a stackable heat pipe assembly 100, under vacuum, having a working substance therein, comprising first and second conductive metal plates 110, 180, a conductive metal tube 150, and a working pipe 190 is provided. The first and second conductive metal plates 110, 180, have first and second contact sides 112, 182 and first and second attachment sides 114, 184, respectfully. In the embodiment, the first and second contact sides 112, 182 are substantially planar. The first contact side 112 has a central cavity 222 therein. A through hole 228 is formed through the central cavity 222 of the first contact side 112 and first attachment side 114. The working pipe 190 has an inlet end 198 and an outlet end 192. In an embodiment, a length of the outlet end 192 exceeds that of the inlet end 198; however, the embodiments are not limited thereto. As an example, and not to be limiting, the length of the outlet end 192 can be the same as or less than that of the inlet end 198. When assembled, outer sidewall surfaces of the inlet end 192 rests flush within the through hole 228 of the first conductive metal plate 110.

By 'substantially', it is meant that at least substantially 50%, 60%, 70%, 80%, 90%, 95%, 96%, 97%, 98%, 99%, 99.5%, 99.9%, 99.99%, or at least substantially 99.999% or more of the first and second contact sides are substantially planar over a period of time, e.g., after 1 minute, 5 minutes, 10 minutes, 30 minutes, 1 hour, 4 hours, 8 hours, 12 hours, 1 day, 1 week, 1 month, etc.

Figure 3:
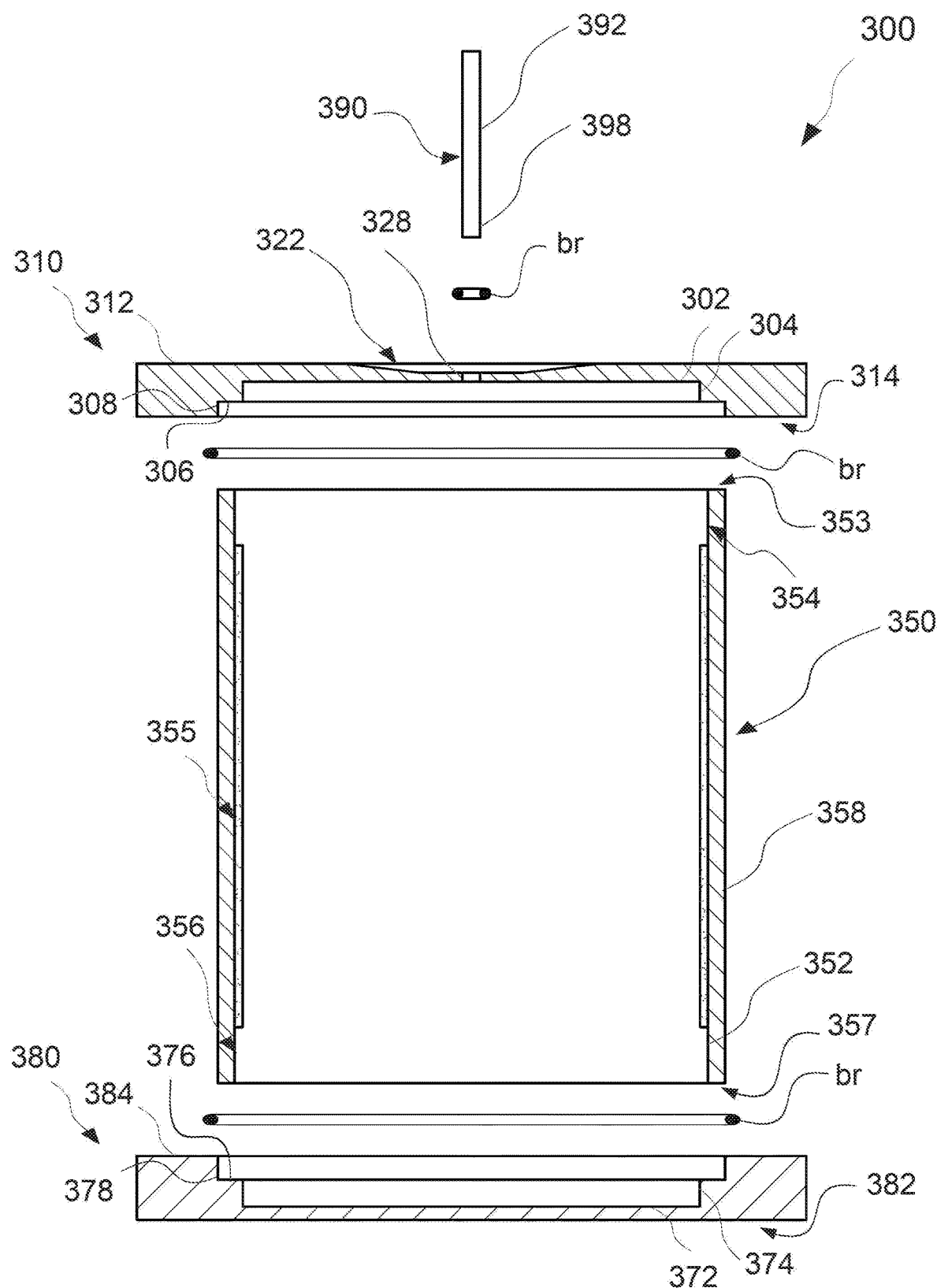
FIG. 3 is a schematic cross-sectional exploded view illustrating a stackable heat pipe assembly, before assembly, according to various embodiments.
Figure 4:
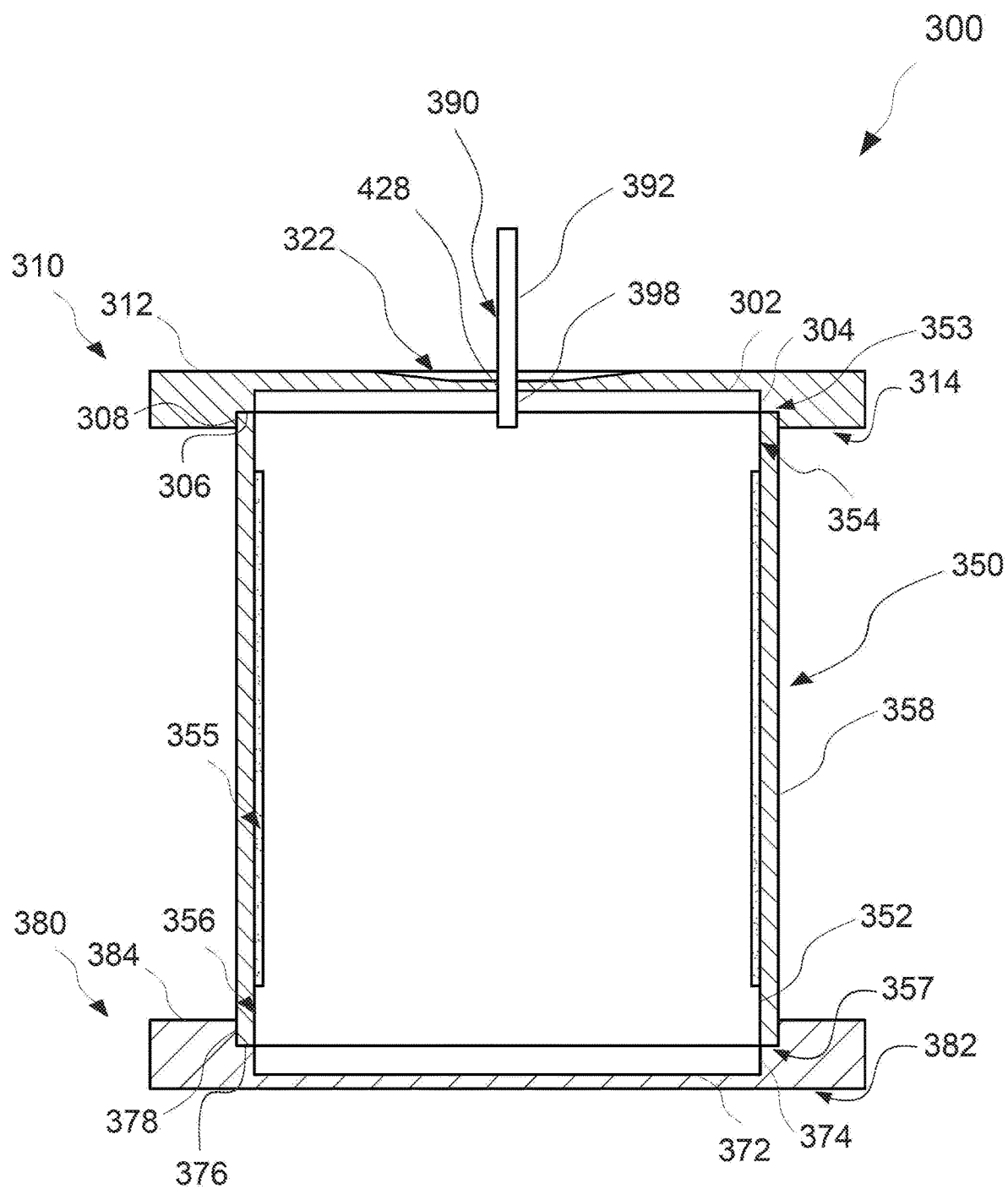
FIG. 4 is a schematic cross-sectional view illustrating a stackable heat pipe assembly according to various embodiments.

FIG. 3 is a schematic cross-sectional exploded view illustrating a stackable heat pipe assembly, before assembly, according to various embodiments. FIG. 4 is a schematic cross-sectional view illustrating a stackable heat pipe assembly according to various embodiments. As shown in FIG. 3 and FIG. 4, in an embodiment, the conductive metal tube 350 comprises an outer wall 328 and an inner wall 352 having a first attachment rim end 354, a second attachment rim end 356, and a wick structure 355 therebetween.

In an embodiment, the first and second attachment sides 314, 384 have first and second planar central portions 302, 372 and first and second walls 304, 374, first and second top ledges 306, 376, and first and second expanded walls 308, 378, theresurrounding, respectively. When assembled, the first attachment rim 353 of the first attachment rim end 354 rests flush on the first top ledge 306 and against the first expanded wall 308 of the first attachment side 314 and the second attachment rim 357 of the second attachment rim end 356 rests flush on the second top ledge 376 and against the second expanded wall 378 of the second attachment side 384. In the embodiments, when assembled, the inner wall 352 of the conductive metal tube 350 is flush with the first and second walls 304, 374 of the first and second attachment sides 314, 384, respectively; however, the embodiments are not limited thereto. In alternative embodiments, the inner wall 352 of the conductive metal tube 350 is not flush with the first and second walls 304, 374 of the first and second attachment sides 314, 384, respectively, as an example and not to be limiting, the inner wall 352 of the conductive metal tube 350 is not flush with the first and second walls 304, 374, whereby the inner wall 352 of the conductive metal tube 350 is within an edge of first and second top ledges 306, 376 or the inner wall 352 of the conductive metal tube 350 surpasses an edge of first and second top ledges 306, 376, so long as the conductive metal tube 350 can be securely assembled to the first and second conductive metal plates 310, 380, respectively.

Figure 5:
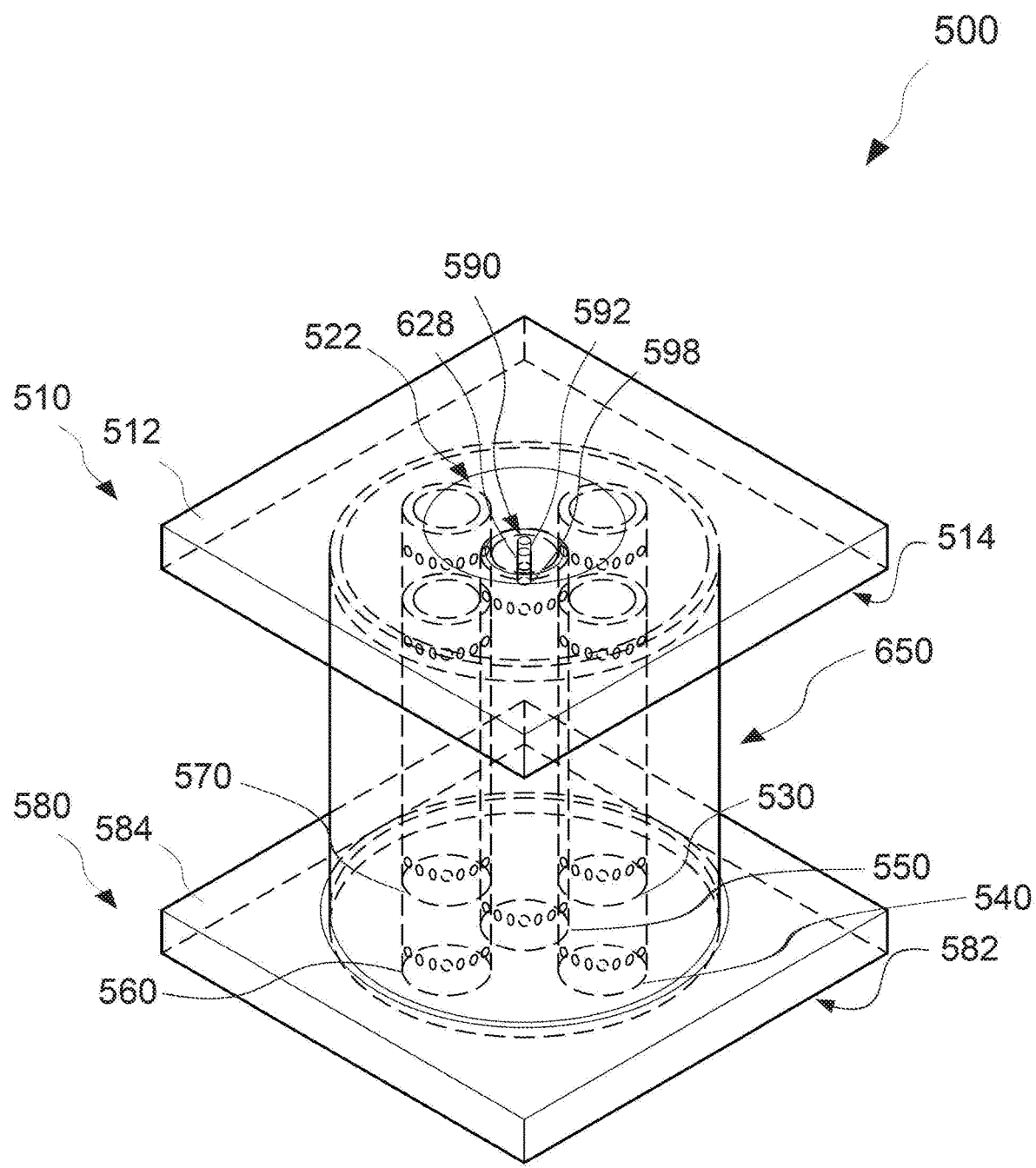
FIG. 5 is a schematic perspective view illustrating a stackable multi-heat pipe assembly according to various embodiments.
Figure 6:
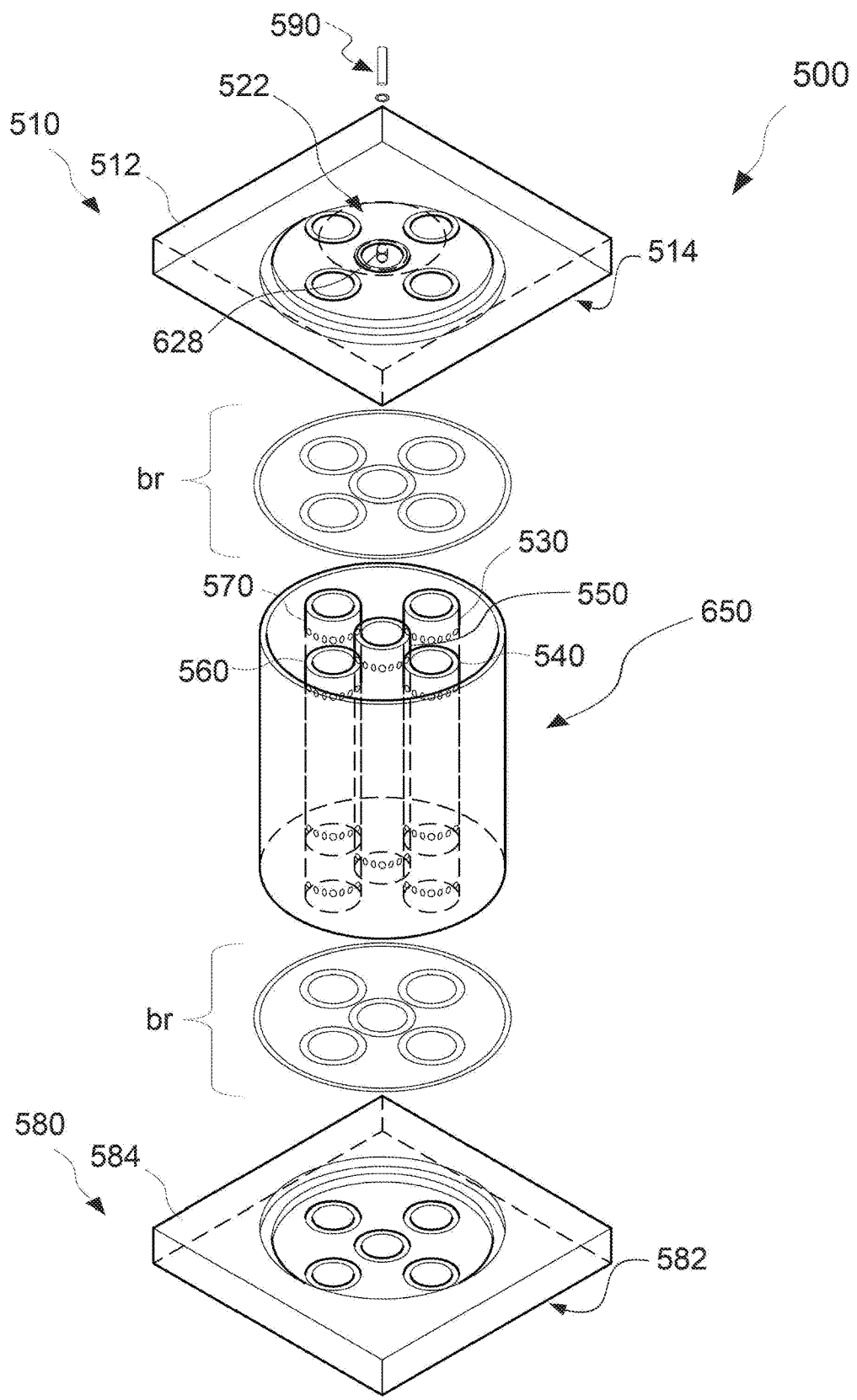
FIG. 6 is a schematic perspective exploded view illustrating a multi-stackable heat pipe assembly according to various embodiments.

In the embodiments, the stackable heat pipe assembly has one conductive metal tube; however, the embodiments are not limited thereto. FIG. 5 is a schematic perspective view illustrating a stackable multi-heat pipe assembly according to various embodiments. FIG. 6 is a schematic perspective exploded view illustrating a multi-stackable heat pipe assembly according to various embodiments. As shown in FIG. 5 and FIG. 6, in alternative embodiments, a stackable multi-heat pipe assembly 500, under vacuum, having a working substance therein, is provided, wherein in addition to the first and second conductive metal plates 510, 580 and working pipe 590, a plurality of conductive metal tubes 530, 540, 550, 560, 570 and a main conductive metal tube 650 are further provided. In an embodiment, the plurality of conductive metal tubes 530, 540, 550, 560, 570 comprises five metal tubes; however the embodiments are not limited thereto. In an alternative embodiment, the plurality of conductive metal tubes comprises fifty or less metal tubes; however the embodiments are not limited thereto. The plurality of conductive metal tubes can comprise two, three, four or more than fifty metal tubes of similar or different sizes, depending upon design specifications.

Figure 7A:
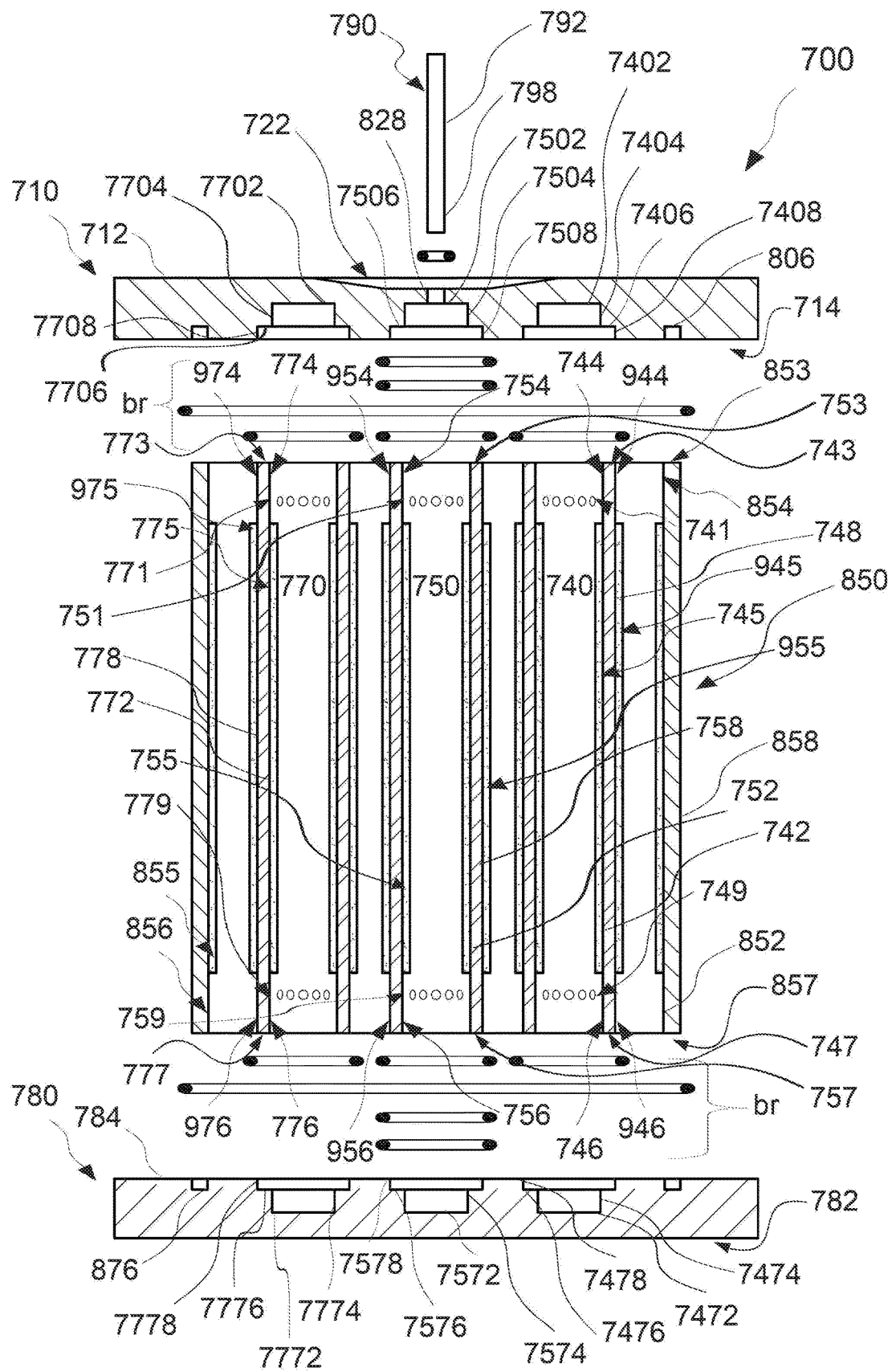
FIG. 7a is a schematic cross-sectional exploded view illustrating a stackable multi-heat pipe assembly, before assembly, according to various embodiments.
Figure 7B:
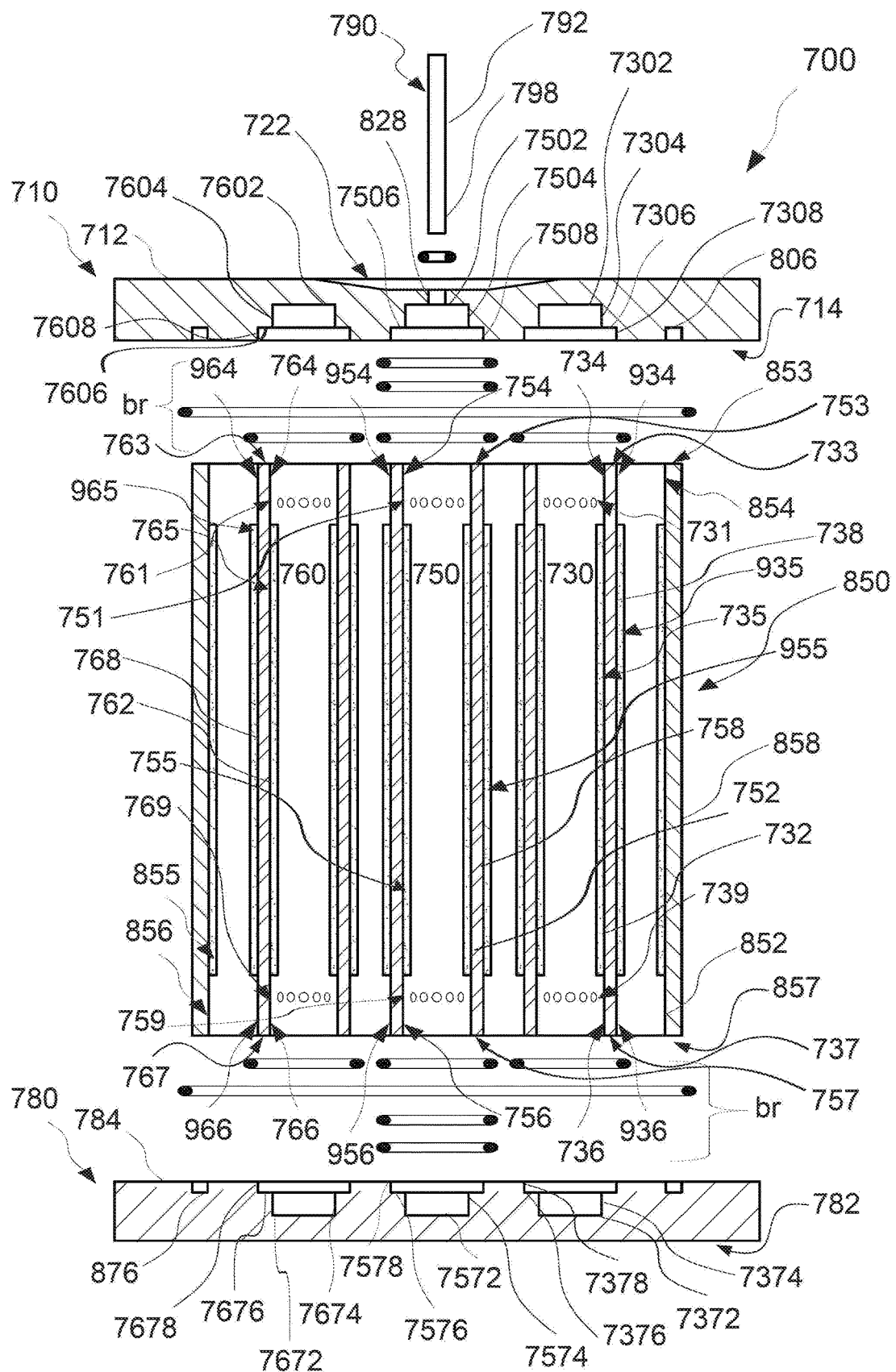
FIG. 7b is a schematic cross-sectional exploded view illustrating the stackable multi-heat pipe assembly of FIG. 7a from a side view, before assembly, according to various embodiments.
Figure 8:
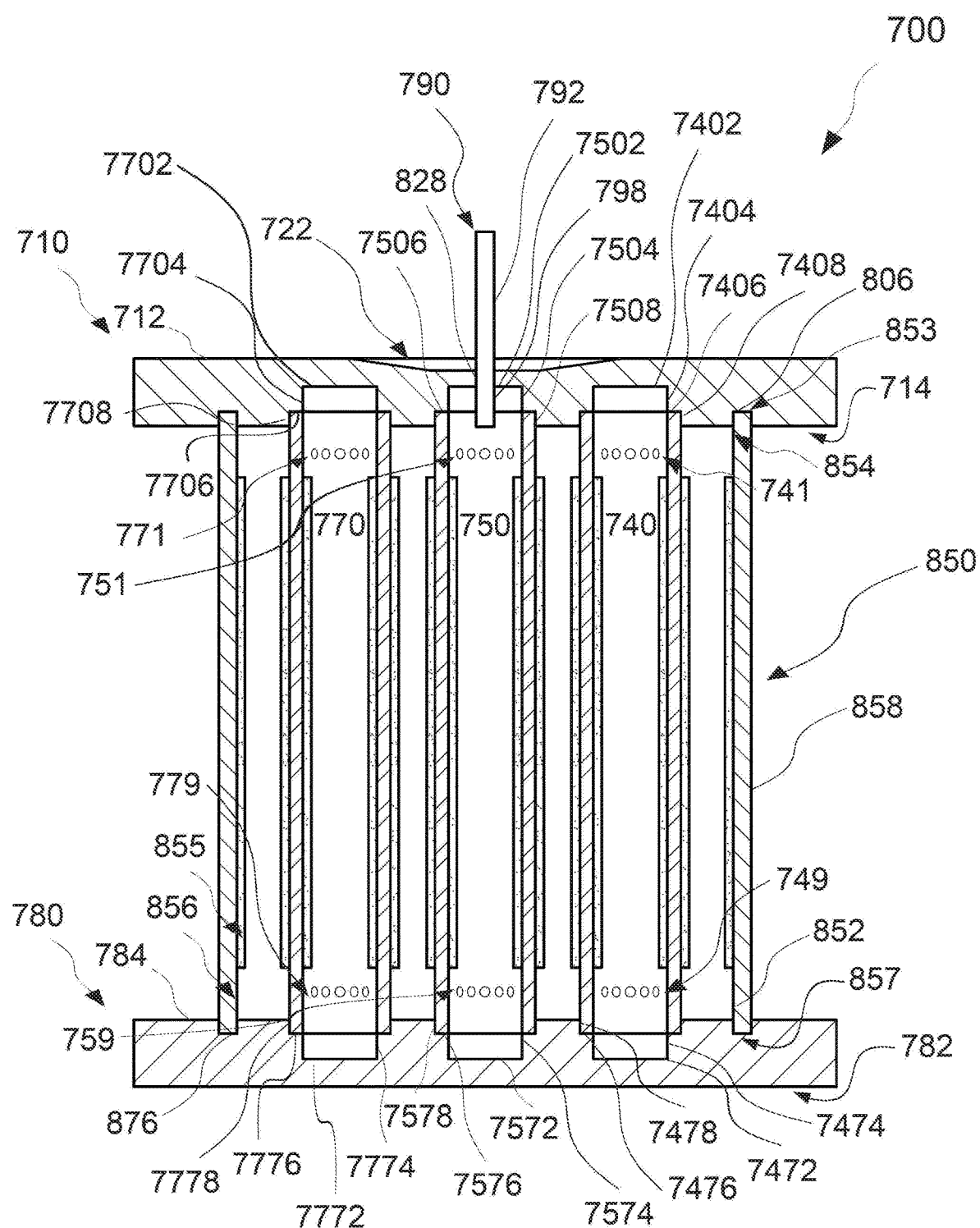
FIG. 8 is a schematic cross-sectional view illustrating a stackable multi-heat pipe assembly according to various embodiments.

FIG. 7a is a schematic cross-sectional exploded view illustrating a stackable multi-heat pipe assembly, before assembly, according to various embodiments. FIG. 7b is a schematic cross-sectional exploded view illustrating the stackable multi-heat pipe assembly of FIG. 7a from a side view, before assembly, according to various embodiments. FIG. 8 is a schematic cross-sectional view illustrating a stackable multi-heat pipe assembly according to various embodiments. As shown in FIG. 7a, FIG. 7b and FIG. 8, in yet another alternative embodiment, a stackable multi-heat pipe assembly 700, under vacuum, having a working substance therein, is provided, wherein in addition to the first and second conductive metal plates 710, 780 and working pipe 790, a plurality of conductive metal tubes 730, 740, 750, 760, 770 and a main conductive metal tube 850 are further provided. Each of the plurality of conductive metal tubes 730, 740, 750, 760, 770 comprises an outer wall 738, 748, 758, 768, 778 and an inner wall 732, 742, 752, 762, 772 having a first outer attachment rim end 934, 944, 954, 964, 974, a second outer attachment rim end 936, 946, 956, 966, 976, and an outer wick structure 935, 945, 955, 965, 975 therebetween and a first inner attachment rim end 734, 744, 754, 764, 774, a second inner attachment rim end 736, 746, 756, 766, 776, and an inner wick structure therebetween 735, 745, 755, 765, 775, respectively. Additionally, the first outer attachment rim end 934, 944, 954, 964, 974 and first inner attachment rim end 734, 744, 754, 764, 774 and second outer attachment rim end 936, 946, 956, 966, 976 and second inner attachment rim end 736, 746, 756, 766, 776 further comprise a plurality of through holes 731, 741, 751, 761, 771, 739, 749, 759, 769, 779 therethrough, respectively, between the inner and outer wick structures 735, 745, 755, 765, 775, 935, 945, 955, 965, 975 and first and second attachment rims 733, 743, 753, 763, 773, 737, 747, 757, 767, 777 of each of the plurality of conductive metal tubes 730, 740, 750, 760, 770, respectfully.

In the embodiment, the main conductive metal tube 850, surrounding the plurality of conductive metal tubes 730, 740, 750, 760, 770, comprise a main outer wall 858 and a main inner wall 852 having a first main attachment rim end 854, a second main attachment rim end 856, and a main wick structure 855 therebetween.

The plurality of through holes 731, 741, 751, 761, 771, 739, 749, 759, 769, 779 allow for efficient flow of vapor of the working substance to be drawn to the wick structures 735, 745, 755, 765, 775, 935, 945, 955, 965, 975 of the inner and outer walls 732, 742, 752, 762, 772, 738, 748, 758, 768, 778 of the plurality of conductive metal tubes 730, 740, 750, 760, 770 and the main inner wall 852 of the main conductive metal tube 850 when flowing back to a heat source side.

In an embodiment, in addition to the first and second attachment sides 714, 784 having first and second planar central portions 7502, 7572 and first and second walls 7504, 7574, first and second top ledges 7506, 7576, and first and second expanded walls 7508, 7578 theresurrounding, respectively, the first and second attachment sides 714, 784 further comprise a plurality of first and second planar cylindrical portions 7302, 7402, 7602, 7702, 7372, 7472, 7672, 7772 and first and second cylindrical walls 7304, 7404, 7604, 7704, 7374, 7474, 7674, 7774, first and second cylindrical top ledges 7306, 7406, 7606, 7706, 7376, 7476, 7676, 7776, and first and second cylindrical expanded walls 7308, 7408, 7608, 7708, 7378, 7478, 7678, 7778 theresurrounding, respectively. Also, the first and second attachment sides 714, 784 yet further comprise first and second main circular grooves 806, 876, surrounding the first and second substantially planar central portions 7502, 7572 and plurality of first and second substantially planar cylindrical portions 7302, 7402, 7602, 7702, 7372, 7472, 7672, 7772, respectively.

When assembled, as an example, and not to be limiting, the first attachment rim 753 of the first attachment rim ends 754, 954 of one of the plurality of conductive metal tubes 750 rests flush on the first top ledge 7506 and against the first expanded wall 7508 of the first substantially planar central portion 7502 of the first attachment side 714 and the second attachment rim 757 of the second attachment rim ends 756, 956 rests flush on the second top ledge 7576 and against the second expanded wall 7578 of the second substantially planar central portion 7572 of the second attachment side 784, respectively. Also, the first attachment rims 733, 743, 763, 773 of the first attachment rim ends 734, 744, 764, 774, 934, 944, 964, 974 of each one of the remaining plurality of conductive metal tubes 730, 740, 760, 770 rests flush on the first top ledges 7306, 7406, 7606, 7706 and against the first expanded walls 7308, 7408, 7608, 7708 of each one of the plurality of first substantially planar cylindrical portions 7302, 7402, 7602, 7702 of the first attachment side 714 and the second attachment rims 737, 747, 767, 777 of the second attachment rim ends 736, 746, 766, 776, 936, 946, 966, 976 rest flush on the second top ledges 7376, 7476, 7676, 7776 and against the second expanded walls 7378, 7478, 7678, 7778 of each one of the plurality of second substantially planar cylindrical portions 7372, 7472, 7672, 7772 of the second attachment side 784, respectively. Additionally, a first main attachment rim 853 of the first main attachment rim end 854 and a second main attachment rim 857 of the second main attachment rim end 856 of the main conductive metal tube 850 rests flush within the first and second main circular grooves 806, 876, respectively. In the embodiments, the width of the first and second main circular grooves 806, 876 is the same as the thickness of the first and second main attachment rims 853, 857, respectively.

In the embodiments, when assembled, the inner walls 732, 742, 752, 762, 772 of the plurality of conductive metal tubes 730, 740, 750, 760, 770 are flush with the first and second cylindrical walls 7304, 7404, 7504, 7604, 7704, 7374, 7474, 7574, 7674, 7774 of the first and second attachment sides 714, 784, respectively; however, the embodiments are not limited thereto. In alternative embodiments, as an example and not to be limiting, the inner walls 732, 742, 752, 762, 772 of the plurality of conductive metal tubes 730, 740, 750, 760, 770 are not flush with the first and second cylindrical walls 7304, 7404, 7504, 7604, 7704, 7374, 7474, 7574, 7674, 7774, whereby the inner walls 732, 742, 752, 762, 772 of the plurality of conductive metal tubes 730, 740, 750, 760, 770 is within the edges of the first and second top ledges 7306, 7406, 7506, 7606, 7706, 7376, 7476, 7576, 7676, 7776, respectively, or the inner walls 732, 742, 752, 762, 772 of the plurality of conductive metal tubes 730, 740, 750, 760, 770 surpasses the edges of the first and second top ledges 7306, 7406, 7506, 7606, 7706, 7376, 7476, 7576, 7676, 7776, so long as the plurality of conductive metal tubes 730, 740, 750, 760, 770 can be securely assembled to the first and second conductive metal plates 710, 780, respectively.

Figure 9:
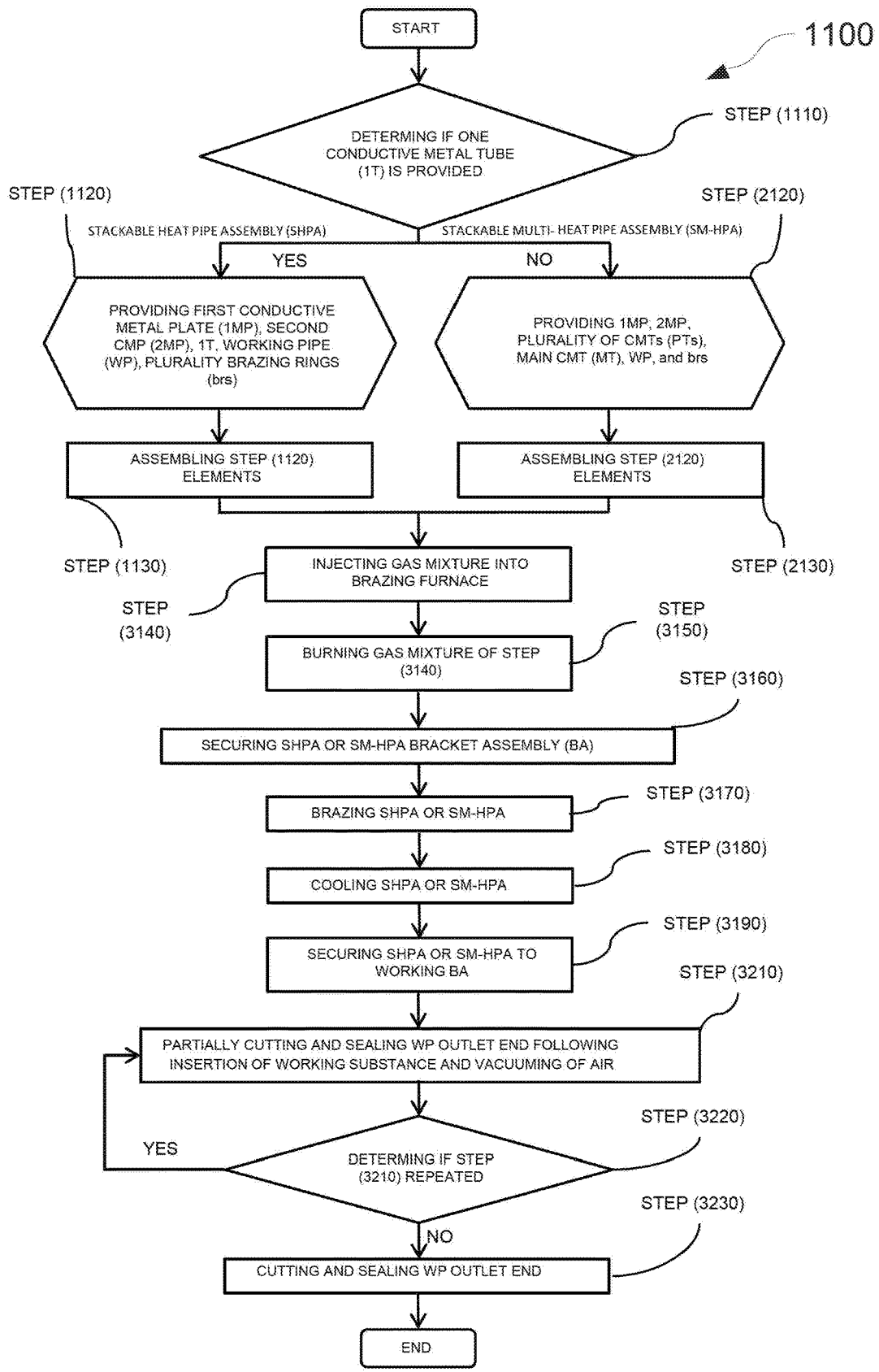
FIG. 9 is a flow chart illustrating a method of making a stackable heat pipe assembly according to various embodiments.

FIG. 9 is a flow chart illustrating a method of making a stackable heat pipe assembly according to various embodiments. As shown in FIG. 9, and referring again to FIGS. 1 to 8, in an embodiment, a method of making a stackable heat pipe assembly 100, 300 under vacuum, having a working substance therein is provided. The stackable heat pipe assembly 100, 300 comprises first and second conductive metal plates 110, 310, 180, 380 a conductive metal tube, and a working pipe 190, 390. In an alternative embodiment, in addition to the first and second conductive metal plates 510, 710, 580, 780 and working pipe 590, 790, the stackable heat pipe assembly 500, 700 comprises a plurality of conductive metal tubes 530, 540, 550, 560, 570, 730, 740, 750, 760, 770 and a main conductive metal tube 650, 850. In an embodiment, the plurality of conductive metal tubes 530, 540, 550, 560, 570, 730, 740, 750, 760, 770 comprises five metal tubes; however the embodiments are not limited thereto. In an alternative embodiment, the plurality of conductive metal tubes comprises fifty or less metal tubes; however the embodiments are not limited thereto. The plurality of conductive metal tubes can comprise two, three, four or more than fifty metal tubes of similar or different sizes, depending upon design specifications.

In an embodiment, the method comprises Step (1110): determining if one conductive metal tube is to be provided, if no, performing Step (2120), if yes, performing Step (1120). In an embodiment, if it is determined that one conductive metal tube is to be provided, then Step (1120): providing a first conductive metal plate 110, 310, second conductive metal plate 180, 380, a conductive metal tube 150, 350, a working pipe 190 and a plurality of brazing rings brs is performed. In the embodiments, the first and second conductive metal plates 110, 310, 180, 380 have first and second contact sides 112, 312, 182, 382 and first and second attachment sides 114, 314, 184, 384, respectfully. The first and second contact sides 112, 312, 182, 382 are substantially planar. The first contact side 112, 312 has a central cavity 222, 322 therein. A through hole 228, 328 is formed through the central cavity 222, 322 of the first contact side 112, 312 and first attachment side 114, 314. The working pipe 190, 380 has an inlet end 198, 398 and an outlet end 192, 398 and the length of the outlet end 192, 398 exceeds that of the inlet end 198, 398; however, the embodiments are not limited thereto. As an example, and not to be limiting, the length of the outlet end 192, 398 can be the same as or less than that of the inlet end 198, 398. When assembled, outer sidewall surfaces of the inlet end 198, 398 rests flush within the through hole 228, 328 of the first conductive metal plate 110, 310.

By 'substantially', it is meant that at least substantially 50%, 60%, 70%, 80%, 90%, 95%, 96%, 97%, 98%, 99%, 99.5%, 99.9%, 99.99%, or at least substantially 99.999% or more of the first and second contact sides are substantially planar over a period of time, e.g., after 1 minute, 5 minutes, 10 minutes, 30 minutes, 1 hour, 4 hours, 8 hours, 12 hours, 1 day, 1 week, 1 month, etc.

In an embodiment, the conductive metal tube 150, 350 comprises an outer wall 128, 328 and an inner wall 152, 352 having a first attachment rim end 154, 354, a second attachment rim end 156, 356, and a wick structure 155, 355 therebetween.

In an embodiment, the first and second attachment sides 114, 314, 184, 384 have first and second planar central portions 102, 172, 302, 372 and first and second walls 104, 304, 174, 374, first and second top ledges 106, 306, 176, 376, and first and second expanded walls 108, 308, 178, 378, theresurrounding, respectively.

In an embodiment, the method further comprises Step (1130): assembling the first conductive metal plate 110, 310, second conductive metal plate 180, 380, conductive metal tube 150, 350, working pipe 190, 390 and plurality of brazing rings brs, wherein the plurality of brazing rings brs are used to braze the working pipe 190, 390 to the through hole 128, 228 of the first conductive metal plate 110, 310 and the first and second substantially planar central portions 102, 172, 302, 372 of the first and second conductive metal plates 110, 310, 180, 380 to the first and second attachment rim ends 154, 354, 156, 356 of the conductive metal tube 150, 350, respectively, then, performing Step (3140).

In an embodiment, the first attachment rim 153, 353 of the first attachment rim end 154, 354 rests flush on the first top ledge 106, 306 and against the first expanded wall 108, 308 of the first attachment side 114, 314 and the second attachment rim 157, 357 of the second attachment rim end 156, 356 rests flush on the second top ledge 176, 376 and against the second expanded wall 178, 378 of the second attachment side 184, 384.

In an alternative embodiment, if it is determined that one conductive metal tube is not to be provided, then Step (2120): providing a first conductive metal plate 310, 510, second conductive metal plate 380, 580, a plurality of conductive metal tubes 530, 540, 550, 560, 570, 730, 740, 750, 760, 770, a main conductive metal tube 650, 850 a working pipe 590, 790, and a plurality of brazing rings brs is performed. In an embodiment, the plurality of conductive metal tubes 530, 540, 550, 560, 570, 730, 740, 750, 760, 770 comprises five metal tubes; however the embodiments are not limited thereto. In an alternative embodiment, the plurality of conductive metal tubes comprises fifty or less metal tubes; however the embodiments are not limited thereto. The plurality of conductive metal tubes can comprise two, three, four or more than fifty metal tubes of similar or different sizes, depending upon design specifications.

In the embodiment, each of the plurality of conductive metal tubes 530, 540, 550, 560, 570, 730, 740, 750, 760, 770 comprises an outer wall 738, 748, 758, 768, 778 and an inner wall 732, 742, 752, 762, 772 having a first outer attachment rim end 934, 944, 954, 964, 974, a second outer attachment rim end 936, 946, 956, 966, 976, and an outer wick structure 935, 945, 955, 965, 975 therebetween and a first inner attachment rim end 734, 744, 754, 764, 774, a second inner attachment rim end 736, 746, 756, 766, 776, and an inner wick structure therebetween 735, 745, 755, 765, 775, respectively. Additionally, the first outer attachment rim end 934, 944, 954, 964, 974 and first inner attachment rim end 734, 744, 754, 764, 774 and second outer attachment rim end 936, 946, 956, 966, 976 and second inner attachment rim end 736, 746, 756, 766, 776 further comprise a plurality of through holes 731, 741, 751, 761, 771, 739, 749, 759, 769, 779 therethrough, respectively, between the inner and outer wick structures 735, 745, 755, 765, 775, 935, 945, 955, 965, 975 and first and second attachment rims 733, 743, 753, 763, 773, 737, 747, 757, 767, 777 of each of the plurality of conductive metal tubes 530, 540, 550, 560, 570, 730, 740, 750, 760, 770, respectfully.

In the embodiment, the main conductive metal tube 650, 850, surrounding the plurality of conductive metal tubes 530, 540, 550, 560, 570, 730, 740, 750, 760, 770, comprise a main outer wall 858 and a main inner wall 852 having a first main attachment rim end 854, a second main attachment rim end 856, and a main wick structure 855 therebetween.

The plurality of through holes 731, 741, 751, 761, 771, 739, 749, 759, 769, 779 allow for efficient flow of vapor of the working substance to be drawn to the wick structures of the inner and outer walls of the plurality of conductive metal tubes 530, 540, 550, 560, 570, 730, 740, 750, 760, 770 and the main inner wall 822 of the main conductive metal tube 850 when flowing back to a heat source side.

In an embodiment, in addition to the first and second attachment sides 514, 584, 714, 784 having first and second planar central portions 7502, 7572 and first and second walls 7504, 7574, first and second top ledges 7506, 7576, and first and second expanded walls 7508, 7578 theresurrounding, respectively, the first and second attachment sides 714, 784 further comprise a plurality of first and second planar cylindrical portions 7302, 7402, 7602, 7702, 7372, 7472, 7672, 7772 and first and second cylindrical walls 7304, 7404, 7604, 7704, 7374, 7474, 7674, 7774, first and second cylindrical top ledges 7306, 7406, 7606, 7706, 7376, 7476, 7676, 7776, and first and second cylindrical expanded walls 7308, 7408, 7608, 7708, 7378, 7478, 7678, 7778 theresurrounding, respectively. Also, the first and second attachment sides 714, 784 yet further comprise first and second main circular grooves 806, 876, surrounding the first and second substantially planar central portions 7502, 7572 and plurality of first and second substantially planar cylindrical portions 7302, 7402, 7602, 7702, 7372, 7472, 7672, 7772, respectively.

In an embodiment, the method further comprises Step (2130): assembling the first conductive metal plate 510, 710, second conductive metal plate 580, 780, plurality of conductive metal tubes 530, 540, 550, 560, 570, 730, 740, 750, 760, 770, main conductive metal tube 650, 850 working pipe 590, 790, and plurality of brazing rings brs, wherein the plurality of brazing rings brs are used to braze the working pipe 590, 790 to the through hole 628, 828 of the first conductive metal plate 510, 710 and the first and second substantially planar central portions 7502, 7572 of the first and second conductive metal plates 510, 710 to the first and second attachment rim ends 754, 756, 954, 956 of one of a plurality of conductive metal tubes 550, 750, respectively. A plurality of brazing rings brs are used to braze the first and second planar cylindrical portions 7302, 7402, 7602, 7702, 7372, 7472, 7672, 7772 of the first and second conductive metal plates 510, 580, 710, 780 to each of the plurality of first and second outer attachment rim ends 934, 944, 964, 974, 936, 946, 966, 976 of the plurality of conductive metal tubes 530, 540, 560, 570, 730, 740, 760, 770, respectively, and first and second main attachment rim ends 853, 857 of the main conductive metal tube 650, 850, respectively, then, performing Step (3140).

In an embodiment, outer sidewall surfaces of the inlet end 598, 798 of the conductive metal tube 590, 790 rests flush within the through hole 628, 828 of the first conductive metal plate 510, 710. In an embodiment, as an example, and not to be limiting, the first attachment rim 753 of the first attachment rim ends 754, 954 of one of the plurality of conductive metal tubes 750 rests flush on the first top ledge 7506 and against the first expanded wall 7508 of the first substantially planar central portion 7502 of the first attachment side 714 and the second attachment rim 757 of the second attachment rim ends 756, 956 rests flush on the second top ledge 7576 and against the second expanded wall 7578 of the second substantially planar central portion 7572 of the second attachment side 784, respectively. Also, the first attachment rims 733, 743, 763, 773 of the first attachment rim ends 734, 744, 764, 774, 934, 944, 964, 974 of each one of the remaining plurality of conductive metal tubes 730, 740, 760, 770 rests flush on the first top ledges 7306, 7406, 7606, 7706 and against the first expanded walls 7308, 7408, 7608, 7708 of each one of the plurality of first substantially planar cylindrical portions 7302, 7402, 7602, 7702 of the first attachment side 714 and the second attachment rims 737, 747, 767, 777 of the second attachment rim ends 736, 746, 766, 776, 936, 946, 966, 976 rest flush on the second top ledges 7376, 7476, 7676, 7776 and against the second expanded walls 7378, 7478, 7678, 7778 of each one of the plurality of second substantially planar cylindrical portions 7372, 7472, 7672, 7772 of the second attachment side 784, respectively. Additionally, a first main attachment rim 853 of the first main attachment rim end 854 and a second main attachment rim 857 of the second main attachment rim end 856 of the main conductive metal tube 850 rests flush within the first and second main circular grooves 806, 876, respectively. In the embodiments, the width of the first and second main circular grooves 806, 876 is the same as the thickness of the first and second main attachment rims 853, 857, respectively.

In the embodiments, when assembled, the inner walls 732, 742, 752, 762, 772 of the plurality of conductive metal tubes 730, 740, 750, 760, 770 are flush with the first and second cylindrical walls 7304, 7404, 7504, 7604, 7704, 7374, 7474, 7574, 7674, 7774 of the first and second attachment sides 714, 784, respectively; however, the embodiments are not limited thereto. In alternative embodiments, as an example and not to be limiting, the inner walls 732, 742, 752, 762, 772 of the plurality of conductive metal tubes 730, 740, 750, 760, 770 are not flush with the first and second cylindrical walls 7304, 7404, 7504, 7604, 7704, 7374, 7474, 7574, 7674, 7774, whereby the inner walls 732, 742, 752, 762, 772 of the plurality of conductive metal tubes 730, 740, 750, 760, 770 is within the edges of the first and second top ledges 7306, 7406, 7506, 7606, 7706, 7376, 7476, 7576, 7676, 7776, respectively, or the inner walls 732, 742, 752, 762, 772 of the plurality of conductive metal tubes 730, 740, 750, 760, 770 surpasses the edges of the first and second top ledges 7306, 7406, 7506, 7606, 7706, 7376, 7476, 7576, 7676, 7776, so long as the plurality of conductive metal tubes 730, 740, 750, 760, 770 can be securely assembled to the first and second conductive metal plates 710, 780, respectively.

In an embodiment, the method further comprises Step (3140): injecting a gas mixture of N2, NH4 and H2 having a ratio of 2:1:1 into a steel liner of a brazing furnace, Step (3150): burning the gas mixture of Step (3140), wherein the brazing furnace is heated to at least 220° Celsius, burning the gas mixture, eliminating oxygen, and removing impurities from the steel liner of the brazing furnace to obviate oxidation of the stackable heat pipe assembly 100, 300 or stackable multi-heat pipe assembly 500, 700 in the brazing furnace, and Step (3160): securing the stackable heat pipe assembly 100, 300 or stackable multi-heat pipe assembly 500, 700 to a bracket assembly of a conveyor system of the brazing furnace. Additionally, the method further comprises Step (3170): brazing the stackable heat pipe assembly 100, 300 or stackable multi-heat pipe assembly 500, 700, wherein the brazing furnace is heated to at least 780° Celsius, whereby the plurality of brazing rings brs are melted, Step (3180): cooling the stackable heat pipe assembly 100, 300 or stackable multi-heat pipe assembly 500, 700, wherein the stackable heat pipe assembly or stackable multi-heat pipe assembly is cooled to at least 150° Celsius, and Step (3190): securing the stackable heat pipe assembly 100, 300 or stackable multi-heat pipe assembly 500, 700 to a working bracket assembly. Also, the method further comprises Step (3210): partially cutting and sealing the outlet end 192, 392, 592, 792 of the working pipe 190, 390, 590, 790 of the stackable heat pipe assembly 100, 300 or stackable multi-heat pipe assembly 500, 700, following insertion of the working substance therein and vacuuming of air thereout, Step (3220): determining if Step (3210) is to be repeated, if yes, performing Step (3210), if no, performing Step (3230), and Step (3230): cutting and sealing the outlet end 192, 392, 592, 792 of the working pipe 190, 390, 590, 790 of the stackable heat pipe assembly 100, 300 or stackable multi-heat pipe assembly 500, 700, whereby a top of the final outlet end 190, 390, 590, 790 is lower than a surface plane of the first contact side 112, 312, 512, 712 of the first conductive metal plate 110, 310, 510, 710.

In the embodiments, the first conductive metal plate 110, 310, 510, 710 second conductive metal plate 180, 380, 580, 780, conductive metal tube and plurality of conductive metal tubes 150, 350, 530, 540, 550, 560, 570, 730, 740, 750, 760, 770, main conductive metal tube 650, 850 and working pipe 190, 390, 590, 790 are made of copper; however the embodiments are not limited thereto. In an alternative embodiment, the first conductive metal plate 110, 310, 510, 710 second conductive metal plate 180, 380, 580, 780, conductive metal tube 150, 350, 530, 540, 550, 560, 570, 730, 740, 750, 760, 770, main conductive metal tube 650, 850 and working pipe 190, 390, 590, 790 are made of monel, nickel, or titanium.

In the embodiments, the first and second conductive metal plates 180, 380, 580, 780 are quadrilateral shaped; however, the invention is not limited thereto. The first and second conductive metal plates 180, 380, 580, 780 can be angular shaped, round shaped or any other shape, so long as the first and second conductive metal plates are able to effectively transfer heat through thermal conductivity.

In the embodiments, the plurality of conductive metal tubes 530, 540, 560, 570, 730, 740, 760, 770, equidistantly surround one of the plurality of conductive metal tubes 550, 750, wherein, two opposing conductive metal tubes 540 and 570 and 530 and 560 are disposed closest to the lateral sides of the quadrilateral shaped first and second conductive metal plates 580, 780; however, the embodiments are not limited thereto. The plurality of conductive metal tubes 530, 540, 560, 570, 730, 740, 760, 770, can be disposed non-equidistantly around one of the plurality of conductive metal tubes 550, 750 and not closest to the sides of the first and second conductive metal plates 580, 780, depending upon the shape of the first and second conductive metal plates 580, 780 and design specifications.

In the embodiments, the wick structure 155, 355, 735, 745, 755, 765, 775, 935, 945, 955, 965, 975, 855 is a sintered powder wick structure, or more specifically, a copper sintered powder wick; however, the embodiments are not limited thereto. The wick structure 155, 355, 735, 745, 755, 765, 775, 935, 945, 955, 965, 975, 855 can be any type of wick structure or combination of wick structures, for example, and not to be limiting, a screen mesh wick structure or groove wick structure or the like, made out of different types of materials or combination of conductive materials other than copper. So long as the condensed working substance can be drawn to the wick structure 155, 355, 735, 745, 755, 765, 775, 935, 945, 955, 965, 975, 855 of the inner wall 152, 352 of the conductive metal tube 150, 350 and inner and outer walls 530, 540, 550, 560, 570, 730, 740, 750, 760, 770 of the plurality of conductive metal tubes 530, 540, 550, 560, 570, 730, 740, 750, 760, 770 and main inner wall 852 of the main conductive metal tube 650, 850 to flow back to the heat source side.

In an embodiment, the conductive metal tube 150, 350 and plurality of conductive metal tubes 530, 540, 550, 560, 570, 730, 740, 750, 760, 770 are around 100 millimetres and 75 millimetres in diameter, respectively, from outer wall to outer wall; however, the embodiments are not limited thereto. The conductive metal tube and plurality of conductive metal tubes can be less than or greater than 100 millimetres and 75 millimetres, respectively, depending upon design specifications. As an example, and not to be limiting, around 60 millimetres to 140 millimetres in diameter, and around 25 millimetres to 155 millimetres in diameter, respectively.

In an embodiment, when the conductive metal tube 150, 350 of the stackable heat pipe assembly 100, 300 is around 100 millimetres in diameter, the height thereof is around 100 millimetres; however, the embodiments are not limited thereto. The height of the conductive metal tube 150, 350 can be less than or greater than 100 millimetres, depending upon design specifications. As an example, and not to be limiting, around 60 millimetres to 6 metres.

Additionally, the height of the stackable heat pipe assembly 100, 300, from the two opposing contact sides 112, 182, 312, 382 of the first and second conductive metal plates 110,

180 310, 380 is around 110 millimetres; however, the embodiments are not limited thereto. The height of the stackable heat pipe assembly 100, 300 can be less than or greater than 110 millimetres, depending upon design specifications. As an example, and not to be limiting, around 70 millimetres to 6 metres. Further, the length and width of the first and second conductive metal plates 110, 180 310, 380 is also around 110 millimetres each; however, the embodiments are not limited thereto. The length and width of the first and second conductive metal plates 110, 180 310, 380 can be less than or greater than 110 millimetres, depending upon design specifications. As an example, and not to be limiting, around 70 millimetres to 150 millimetres. Also, height of the first and second conductive metal plates 110, 180 310, 380 is around 4.5 millimetres each; however, the embodiments are not limited thereto. The height of the first and second conductive metal plates 110, 180 310, 380 can be less than or greater than 4.5 millimetres, depending upon design specifications. As an example, and not to be limiting, around 4 millimetres to 5 millimetres. Even further, depth of the first and second planar central portions 102, 302, 172, 372 is around 3 millimetres; however, the embodiments are not limited thereto. The depth of the first and second planar central portions 102, 302, 172, 372 can be less than or greater than 3 millimetres, depending upon design specifications. As an example, and not to be limiting, around 2.5 millimetres to 3.5 millimetres. Also, as an example, and not to be limiting, depth and width of the first and second top ledges 106, 176, 306, 376 are 1 millimetres and 1 millimetres, respectively, when the width of the conductive metal tube 150, 350 is 1 millimetres; however, the embodiments are not limited thereto. The depth and width of the first and second top ledges 106, 176, 306, 376 can be less than or greater than 1 millimetres, respectively, depending upon design specifications. As an example, and not to be limiting, around 0.75 millimetres to 3.5 millimetres, respectively.

In an alternative embodiment, when each of the plurality of conductive metal tubes 530, 540, 550, 560, 570, 730, 740, 750, 760, 770 are around 75 millimetres in diameter and the plurality of conductive metal tubes 530, 540, 550, 560, 570, 730, 740, 750, 760, 770 comprise five conductive metal tubes, the diameter of the main conductive metal tube 650, 850 is around 250 millimetres, from outer wall to outer wall; however, the embodiments are not limited thereto. The diameter of the main conductive metal tube 650, 850 can be less than or greater than 250 millimetres, depending up the diameter and number of the plurality of conductive metal tubes 530, 540, 550, 560, 570, 730, 740, 750, 760, 770, as an example, and not to be limiting, around 100 millimetres (five conductive metal tubes/25 millimetres diameter) to 600 millimetres.

In an embodiment, when each of the plurality of conductive metal tubes 530, 540, 550, 560, 570, 730, 740, 750, 760, 770 are around 75 millimetres in diameter and the diameter of the main conductive metal tube 650, 850 is around 250 millimetres; however, the embodiments are not limited thereto. The height of the conductive metal tube 530, 540, 550, 560, 570, 730, 740, 750, 760, 770 can be less than or greater than 250 millimetres, depending upon design specifications. As an example, and not to be limiting, around 100 millimetres (five conductive metal tubes/25 millimetres diameter) to 6 metres. Additionally, the height of the stackable multi-heat pipe assembly 500, 700, from the two opposing contact sides 512, 582, 712, 782 of the first and second conductive metal plates 510, 580 710, 780 is around 260 millimetres; however, the embodiments are not limited thereto. The height of the stackable multi-heat pipe 500, 700 assembly can be less than or greater than 260 millimetres, depending upon design specifications. As an example, and not to be limiting, around 110 millimetres (five conductive metal tubes/25 millimetres diameter) to 6 metres. Further, the length and width of the first and second conductive metal plates 510, 580 710, 780 is also around 260 millimetres each; however, the embodiments are not limited thereto. The length and width of the first and second conductive metal plates 510, 580 710, 780 can be less than or greater than 260 millimetres, depending upon design specifications. As an example, and not to be limiting, around 110 millimetres to 610 millimetres. Also, height of the first and second conductive metal plates 510, 580 710, 780 is around 4.5 millimetres each; however, the embodiments are not limited thereto. The height of the first and second conductive metal plates 510, 580 710, 780 can be less than or greater than 4.5 millimetres, depending upon design specifications. As an example, and not to be limiting, around 4 millimetres to 5 millimetres. Even further, depth of the first and second planar cylindrical portions 7302, 7402, 7602, 7702, 7372, 7472, 7672, 7772 is around 3 millimetres; however, the embodiments are not limited thereto. The depth of the first and second planar cylindrical portions 7302, 7402, 7602, 7702, 7372, 7472, 7672, 7772 can be less than or greater than 3 millimetres, depending upon design specifications. As an example, and not to be limiting, around 2.5 millimetres to 3.5 millimetres. Also, as an example, and not to be limiting, depth and width of the first and second top ledges 7306, 7406, 7506, 7606, 7706, 7376, 7476, 7576, 7676, 7776 are 1 millimetres and 1 millimetres, respectively, when the width of the plurality of conductive metal tubes 530, 540, 550, 560, 570, 730, 740, 750, 760, 770 and main conductive metal tube 650, 850 is 1 millimetres; however, the embodiments are not limited thereto. The depth and width of the first and second top ledges 5306, 5406, 5506, 5606, 5706, 5376, 5476, 5576, 5676, 5776, 7306, 7406, 7506, 7606, 7706, 7376, 7476, 7576, 7676, 7776 can be less than or greater than 1 millimetres, respectively, depending upon design specifications. As an example, and not to be limiting, around 0.75 millimetres to 3.5 millimetres. Even further, the thickness and depth of the first and second main circular grooves 606, 676, 806, 876 is around 1 millimetres by 1 millimetres, respectively; however, the embodiments are not limited thereto. In the embodiment, the thickness and depth of the first and second main circular grooves 606, 676, 806, 876 can be less than or greater than 1 millimetres by 1 millimetres, respectively, depending upon design specifications. As an example, and not to be limiting, around 0.75 millimetres by 0.75 millimetres to 3.5 millimetres to 3.5 millimetres, respectively.

In the embodiments, when the conductive metal tube 150, 350 and each of the plurality of conductive metal tubes 530, 540, 550, 560, 570, 730, 740, 750, 760, 770 are around 100 millimetres and 75 millimetres in diameter, respectively, the thicknesses thereof are around 1 millimetres; however, the embodiments are not limited thereto. The thickness of the conductive metal tube 150, 350 and plurality of conductive metal tubes 530, 540, 550, 560, 570, 730, 740, 750, 760, 770 can be less than or greater than 1 millimetres, depending upon design specifications. As an example, and not to be limiting, when the height of the conductive metal tube 150, 350 and each of the plurality of conductive metal tubes 530, 540, 550, 560, 570, 730, 740, 750, 760, 770 is less than 1 metres, the thickness of the conductive metal tube 150, 350 and each of the plurality of conductive metal tubes 530, 540, 550, 560, 570, 730, 740, 750, 760, 770 is around 0.75 millimetres to 2 millimetres, respectively, and when the height of the conductive metal tube 150, 350 and each of the plurality of conductive metal tubes 530, 540, 550, 560, 570, 730, 740, 750, 760, 770 is over 1 metres, the thickness of the conductive metal tube 150, 350 and each of the plurality of conductive metal tubes 530, 540, 550, 560, 570, 730, 740, 750, 760, 770 is around 2 to 3.5 millimetres, respectively. Additionally, the thickness of the inner wall 152, 352 wick structure 155, 355 of the conductive metal tube 150, 350 and inner and outer wall wick structures 735, 745, 755, 765, 775, 935, 945, 955, 965, 975, of each of the plurality of conductive metal tubes 530, 540, 550, 560, 570, 730, 740, 750, 760, 770 are also around 1 millimetres, respectively; however, the embodiments are not limited thereto. In the embodiments, the thickness of the inner wall 152, 352 wick structure 155, 355 of the conductive metal tube 150, 350 and inner and outer wall wick structures 735, 745, 755, 765, 775, 935, 945, 955, 965, 975, of each of the plurality of conductive metal tubes 530, 540, 550, 560, 570, 730, 740, 750, 760, 770 can be less than or greater than 1 millimetres, depending upon design specifications. As an example, and not to be limiting, around 0.75 millimetres to 3.5 millimetres, similar to that of the thickness of the conductive metal tube 150, 350 and each of the plurality of conductive metal tubes 530, 540, 550, 560, 570, 730, 740, 750, 760, 770.

In an alternative embodiment, when each of the plurality of conductive metal tubes 530, 540, 550, 560, 570, 730, 740, 750, 760, 770 are around 75 millimetres in diameter and the plurality of conductive metal tubes 530, 540, 550, 560, 570, 730, 740, 750, 760, 770 comprise five conductive metal tubes, the thickness of the main conductive metal tube 650, 850 is around 1 millimetres; however, the embodiments are not limited thereto. In the embodiment, the thickness of the main conductive metal tube 650, 850 can be less than or greater than 1 millimetres, depending upon design specifications. As an example, and not to be limiting, around 0.75 millimetres to 3 millimetres. Additionally, the thickness of the main wick structure 655, 855 of the main conductive metal tube 650, 850 is around 1 millimetres; however, the embodiments are not limited thereto. In the embodiment, the thickness of the main wick structure 655, 855 of the main conductive metal tube 650, 850 can be less than or greater than 1 millimetres, depending upon design specifications. As an example, and not to be limiting, around 0.75 millimetres to 3.5 millimetres.

In the embodiments, a plurality of brazing rings brs are used to braze the working pipe 190, 390 to the through hole 225, 428 of the first conductive metal plate 110, 310 and the first and second substantially planar central portions 102, 172, 302, 372 of the first and second conductive metal plates 110, 180, 310, 380 to the first and second attachment rim ends 154, 156, 354, 356 of the conductive metal tube 150, 350, respectively. In an alternative embodiment, in addition to the plurality of brazing rings brs being used to braze the working pipe 590, 790 to the through hole 628, 828 of the first conductive metal plate 510, 710 and the first and second substantially planar central portions 7502, 7572 of the first and second conductive metal plates 510, 710 to the first and second attachment rim ends 754, 756, 954, 956 of one of a plurality of conductive metal tubes 550, 750, respectively. A plurality of brazing rings brs are used to braze the first and second planar cylindrical portions 7302, 7402, 7602, 7702, 7372, 7472, 7672, 7772 of the first and second conductive metal plates 510, 580, 710, 780 to each of the plurality of first and second outer attachment rim ends 934, 944, 964, 974, 936, 946, 966, 976 of the plurality of conductive metal tubes 530, 540, 560, 570, 730, 740, 760, 770, respectively, and first and second main attachment rim ends 853, 857 of the main conductive metal tube 650, 850, respectively. In the embodiments, the brazing rings brs are made of a copper-silver alloy; however, the embodiments are not limited thereto. Other types of material for the brazing rings brs can be employed, so long as the melting point of the brazing rings brs is substantially 780° Celsius and below.

In the embodiments, the working substance of the stackable heat pipe assembly 100, 300 and stackable multi-heat pipe assembly 500, 700 is made of water; however, the embodiments are not limited thereto. Other working substances can be employed, as can be common for those skilled in the art, dependent upon the material of the conductive metal tube 150, 350 or the plurality of conductive metal tubes 530, 540, 550, 560, 570, 730, 740, 750, 760, 770 or main conductive metal tube 650, 850. So long as the working substance can be vaporized by a heat source, and the vapor can condense back to the working substance and be drawn to the wick structures of the inner and outer walls of the plurality of conductive metal tubes 530, 540, 550, 560, 570, 730, 740, 750, 760, 770 and main inner wall 852 of the main conductive metal tube 650, 850 to flow back to the heat source side.

In the embodiments, the outlet end 192, 392, 592, 792 of the working pipe 190, 390, 590, 790 is partially cut and sealed at least once after being assembled, forming a final outlet end 192, 392, 592, 792, following insertion of the working substance therein and vacuuming of air thereout, whereby a top of the final outlet end 192, 392, 592, 792 is lower than a surface plane of the first contact side 112, 312, 512, 712 of the first conductive metal plate 110, 310, 510, 710. In alternative embodiments, the outlet end 192, 392, 592, 792 of the working pipe 190, 390, 590, 790 is partially cut and sealed more than once, following quality control testing of the stackable heat pipe assembly 100, 300 or stackable multi-heat pipe assembly 500, 700.

In the embodiments, the depth of the first and second planar central portions 102, 302, 172, 372 and the first and second planar cylindrical portions 7302, 7402, 7502, 7602, 7702, 7372, 7472, 7572, 7672, 7772 and decreased thickness of the first and second conductive metal plates 110, 180, 310, 380, 510, 710 thereabout, along with the first and second top ledges 106, 176, 306, 376, 7306, 7406, 7506, 7606, 7706, 7376, 7476, 7576, 7676, 7776 and first and second expanded walls 108, 178, 308, 378, 7308, 7408, 7508, 7608, 7708, 7378, 7478, 7578, 7678, 7778 provide maximum efficient heat transfer to the conductive metal tubes and plurality of conductive metal tubes 150, 350, 530, 540, 550, 560, 570, 730, 740, 750, 760, 770 while still maintaining a strong and stable assembly between the conductive metal tube 150, 350, plurality of conductive metal tubes 530, 540, 550, 560, 570, 730, 740, 750, 760, 770 and first and second conductive metal plates 110, 310, 510, 710.

Those skilled in the art will appreciate that the central cavity 222, 322, 522, 752 of the first contact side 112, 312, 512, 712 and first attachment side 114, 314, 514, 714 having a through hole 228, 428, 628, 828 formed and working pipe assembled therethrough, can be formed on other areas of the stackable heat pipe assembly 100, 300 or stackable multi-heat pipe assembly 500, 700, for example, and not to be limiting, at a non-centric position of the first attachment side or on a side of the embodiments. So long as the outlet end 192, 392, 592, 792 of the working pipe 190, 390, 590, 790 can be partially cut and sealed at least once after being assembled, and form a final outlet end 192, 392, 592, 792, following insertion of the working substance therein and vacuuming of air thereout.

In the embodiments, the stackable heat pipe assembly 100, 300 and stackable multi-heat pipe assembly 500, 700 are coated with gold, palladium, or silver; however, the embodiments are not limited thereto. In the embodiments, the coating(s) can be any metallic coating(s) as can be common with cooling and heat transfer systems found in large computer systems, aircraft, spacecraft, satellites, environmental systems, waste heat recovery and power generation systems, and geothermal systems etc. known to those skilled in the art. Also in the embodiments, any surface treatment process(es) or coating technique(s) by which a metallic coating can be applied as a surface treatment to increase the mechanical, electrochemical, or thermal performance of the stackable heat pipe assembly 100, 300 and stackable multi-heat pipe assembly 500, 700 can be employed, as an example, and not to be limiting, a plating process, vapor deposition process or the like. So long as the coating(s), process(es), and/or coating technique(s), at least in part, provide for improved resistance to corrosion; more specifically, improved resistance to corrosion under mechanically challenging operating conditions or the natural environment having mid- to high-temperatures.

Either of the first or second contact sides 112, 312, 512, 712 182, 382, 582, 782 contacts a heat source, whereby vapor of the working substance disposed within the heat source side flows through a center of the conductive metal tube 150, 350 or centers of the plurality of conductive metal tubes 530, 540, 550, 560, 570, 730, 740, 750, 760, 770 and main conductive metal tube 650, 850 to condense back to the working substance and be drawn to the wick structures 155, 355, 735, 745, 755, 765, 775, 935, 945, 955, 965, 975, 855 of the inner wall 152, 352 of the conductive metal tubes 150, 350 and inner and outer walls of the plurality of conductive metal tubes 530, 540, 550, 560, 570, 730, 740, 750, 760, 770 and the main inner wall 822 of the main conductive metal tube 650, 850 to flow back to the heat source side. Also, either of the first or second contact sides is stackable.

Those skilled in the art will appreciate that any type of bracketing or securing means made of an appropriate material for the operating conditions or environments of the embodiments, as an example, and not to be limiting, mechanically challenging operating conditions or the natural environment having mid- to high-temperatures, can be used to secure the stackable heat pipe assembly 100, 300 or stackable multi-heat pipe assembly 500, 700 one on top of the other and to the heat source and/or other system, device or apparatus. As an example, and not to be limiting, brackets, clamps, clips, fasteners, thermal adhesives or the like, can be employed between the two opposing contact sides of the conductive metal plates of two or more stackable heat pipe assemblies 100, 300 or stackable multi-heat pipe assemblies 500, 700 for stacking, securing to a heat source, and/or securing to other thermal blocks, systems, devices, or apparatuses. As an example, and not to be limiting, the systems, devices, or apparatuses can be a thermalelectric module system, device or apparatus, or the like, as can be common to those skilled in the art, for power generation or waste heat recovery. Additionally, in the embodiments, a means to increase thermal efficiency between the two opposing contact sides of the conductive metal plates of two or more stackable heat pipe assemblies 100, 300 or stackable multi-heat pipe assemblies 500, 700, when stacked, as can be common to those skilled in the art, can be used. As an example, and not to be limiting, gold heat transfer foils, sheets or tapes, or other heat transfer foils, sheets or tapes or the like can be employed between the two opposing contact sides of the conductive metal plates, so long as thermal efficiency therebetween can be increased.

Those skilled in the art will appreciate that additional steps can be added to the process in order to incorporate additional features into the finished product. Also, the steps can be altered depending upon different requirements.

As an example, and not to be limiting, a thermal gap filler can be used to fill the final outlet end 192, 392, 592, 792 and central cavity 222, 422, 622, 822 for more efficient thermal transfer. In such an embodiment, any type of thermal gap filler, as can be common to those skilled in the art, as an example, and not to be limiting, such as thermal gap filler putty, thermal gap filler gels, thermal gap filler pads, or the like can be employed, so long as the final outlet end 192, 392, 592, 792 and central cavity 222, 422, 622, 822 is filled for more efficient thermal transfer.

As another example, and not to be limiting, those skilled in the art will appreciate that when the stackable heat pipe assembly 100, 300 and stackable multi-heat pipe assembly 500, 700 is employed as a heat sink, heat sink fins can be added to the outer surface of the conductive metal tube or main conductive metal tube as can be common to those skilled in the art. In such an embodiment, straight quadrilateral shaped fins made of copper are used; however, the embodiments are not limited thereto. Pin fins, flared fin, or other types of fins, having an angular shape, round shape or any other shape, and other conductive metals or materials, such as aluminum, graphite foam, etc. can also be employed, depending upon design specifications. Additionally, any attachment process(es) known to those skilled in the art can be used to attach the fins to the outer surface of the conductive metal tube or main conductive metal tube, so long as the fins are attached sturdily and are able to further dissipate heat over the larger fin areas.

Heat pipes efficiently transport heat from one location to another through an evaporation-condensation process. With no energy input other than heat or moving parts required for operation, heat pipes are quiet and durable. Heat pipes are applied in cooling and heat transfer systems found in mobile phones, computers, aircraft, spacecraft, satellites, and environmental systems. Heat pipes, combined with thermo-electric generators (TEGs), are applied in waste heat recovery and power generation systems. Implementation of heat pipes and TEGs have also been used in geothermal applications where heat from a ground source is extracted to provide geothermal power.

TEG systems using heat pipes, take heat from the heat pipes and output electricity using thermo-electric modules. Thermo-electric modules are made up of many elements of n-type (negatively charged) and p-type (positively charged) semiconductor materials which are electrically connected in series to increase operating voltage and thermally connected in parallel to increase thermal conductivity. When the heat pipe side of the TEG system is heated (heat moved thereto) and the other side cooled by air, water, or another suitable medium, such as another heat pipe (heat moved therefrom), a voltage is generated. With no moving parts and no chemical reactions required for operation, thermo-electric modules are also quiet and durable.

Although heat pipes are applied in many industries, implementation thereof can be challenging; for example, when the heat pipes and accompanying systems must succumb to mechanically challenging operating conditions or the natural environment having mid- to high-temperatures. Additionally, when heat pipes are employed in mid- to high-temperature environments, the shape of the heat pipe must conform to the environment and not compromise its functionality. In addition to eventual wear and corrosion, the distance from the initial heat source to a heat sink or a TEG system, as examples, can be in metres. Generally, the longer the distance required for a heat pipe to travel and the greater the design specialization, the greater the initial, maintenance and replacement costs.

The stackable heat pipe assembly 100, 300 of the embodiments, as an example, and not to be limiting, comprises at least, first and second conductive metal plates 110, 310, 180, 380 a conductive metal tube 150, 350, and a working pipe 190, 390. The first and second conductive metal plates 110, 310, 180, 380 have first and second contact sides 112, 312, 182, 382 and first and second attachment sides 114, 314, 184, 384, respectfully. The first conductive metal plate 110, 310 has a through hole 228, 428 therethrough. The first and second attachment sides 114, 314, 184, 384 have first and second planar central portions 302, 372 and first and second walls 304, 374, first and second top ledges 306, 376, and first and second expanded walls 308, 378, theresurrounding, respectively. The conductive metal tube 150, 350 has an inner wall 152, 352 having a wick structure 155, 355 thereon. A plurality of brazing rings brs are used to braze the working pipe 190, 390 to the through hole 228, 428 and the first and second planar central portions 102, 172, 302, 372 to the first and second attachment rim ends 153, 157, 353, 357, respectively. Either of the first or second contact sides 112, 312, 182, 382 contact a heat source and is stackable. Thus, in the embodiments, implementation of the stackable heat pipe assembly 100, 300 and stackable multi-heat pipe assembly 500, 700 is simplified via the versatility of being able to use the first or second contact sides 112, 182, 312, 382, 512, 582, 712, 782 to contact the heat source, stack multiple stackable heat pipe assemblies 100, 300 one on top of the other for vertical expansion, expand the heat source surface area using the stackable multi-heat pipe assembly 500, 700 for horizontal expansion, and stack multiple stackable multi-heat pipe assemblies 500, 700 one on top of the other also for vertical expansion. The stackable heat pipe assembly 100, 300 or stackable multi-heat pipe assembly 500, 700 of the embodiments provide a modulated uncompromising functional solution to mechanically challenging operating conditions or the natural environment having mid- to high-temperatures. Should eventual wear, corrosion, or other reason arise where one of a plurality of stackable heat pipe assemblies 100, 300 or stackable multi-heat pipe assemblies 500, 700 need to be replaced, just the one stackable heat pipe assembly 100, 300 or stackable multi-heat pipe assembly 500, 700 can be replaced and not the entire unit or heat pipe system. In addition, should the initial heat source to a heat sink or a TEG system, as examples, be in metres, the modulable stackable heat pipe assembly 100, 300 or stackable multi-heat pipe assembly 500, 700 can be employed, decreasing the need for specialized designed heat pipes, thereby decreasing future maintenance and replacement costs.

The details of the construction or composition of the various elements of the stackable heat pipe assembly 100, 300 or stackable multi-heat pipe assembly 500, 700 of the embodiments not otherwise disclosed are not believed to be critical to the present invention, so long as the recited elements poses the strength or mechanical properties needed for them to perform as disclosed. Additional details of construction are believed to be well within the ability of one of ordinary skill in the art.

Unless otherwise indicated, all numbers used herein to express quantities, dimensions, and so forth used should be understood as being modified in all instances by the term "about." The use of the singular includes the plural unless specifically stated otherwise, and use of the terms "and" and "or" means "and/or" unless otherwise indicated.

From the foregoing it will be appreciated that, although specific embodiments have been described herein for purposes of illustration, various modifications can be made without deviating from the spirit and scope of the disclosure. Furthermore, where an alternative is disclosed for a particular embodiment, this alternative can also apply to other embodiments even if not specifically stated.

What is claimed is:

1. A stackable heat pipe assembly, under vacuum, having a working substance therein, comprising:
    a first conductive metal plate having a first contact side and a first attachment side, the first contact side being substantially planar having a central cavity therein, the central cavity of the first contact side and first attachment side having a through hole formed therethrough;
    a second conductive metal plate having a second contact side and a second attachment side, the second contact side being substantially planar; and
    a conductive metal tube, comprising;
        an outer wall; and
        an inner wall having a first attachment rim end and a second attachment rim end; and
    a working pipe having an inlet end and an outlet end, outer sidewall surfaces of the inlet end rests flush within the through hole of the first conductive metal plate,
    wherein the first attachment side comprises a first substantially planar central portion, a first wall surrounding the first substantially planar central portion having a first top ledge, and a first expanded wall surrounding the first top ledge, and wherein when assembled, the first attachment rim of the first attachment rim end rests flush on the first top ledge and against the first expanded wall of the first attachment side,
    wherein the second attachment side comprises a second substantially planar central portion, a second wall surrounding the first substantially planar central portion having a second top ledge, and a second expanded wall surrounding the second top ledge, and wherein when assembled, the second attachment rim of the second attachment rim end rests flush on the second top ledge and against the second expanded wall of the second attachment side,
    wherein a plurality of brazing rings are used to braze the working pipe to the through hole of the first conductive metal plate and the first and second substantially planar central portions of the first and second conductive metal plates to the first and second attachment rim ends of the conductive metal tube, respectively,
    wherein a top of the outlet end of the working pipe is lower than a surface plane of the first contact side of the first conductive metal plate, and
    wherein either of the first or second contact sides contacts a heat source, whereby vapor of the working substance disposed within the heat source side flows through a center of the conductive metal tube to condense back to the working substance and be drawn to the inner wall to flow back to the heat source side, and
    wherein either of the first or second contact sides is stackable.

2. The stackable heat pipe assembly of claim 1, wherein the working substance is made of water.

3. The stackable heat pipe assembly of claim 2, wherein the first conductive metal plate, second conductive metal plate, conductive metal tube, and working pipe are made of copper.

4. The stackable heat pipe assembly of claim 2, wherein the first conductive metal plate, second conductive metal plate, conductive metal tube, and working pipe are made of morel, nickel, or titanium.

5. The stackable heat pipe assembly of claim 1, wherein the brazing rings are made of a copper-silver alloy.

6. The stackable heat pipe assembly of claim 1, wherein the stackable heat pipe assembly is coated with gold, palladium, or silver.

7. The stackable heat pipe assembly of claim 1, wherein the inner wall further comprises a wick structure between the first attachment rim end and second attachment rim end, and wherein vapor of the working substance flowing through the center of the conductive metal tube and condensing back to the working substance is drawn to the wick structure of the inner wall to flow back to the heat source side.

\* \* \* \* \*